US006947761B2

(12) United States Patent
Hutcheson et al.

(10) Patent No.: US 6,947,761 B2
(45) Date of Patent: Sep. 20, 2005

(54) METHOD AND SYSTEM FOR IMPROVING THE EFFICIENCY OF STATE INFORMATION TRANSFER OVER A WIRELESS COMMUNICATIONS NETWORK

(75) Inventors: Doug Hutcheson, San Diego, CA (US); Richard Robinson, Temecula, CA (US); Steven Caliguri, Poway, CA (US)

(73) Assignee: Leap Wireless International Inc., San Diego, CA (US)

(*) Notice: Subject to any disclaimer, the term of this patent is extended or adjusted under 35 U.S.C. 154(b) by 613 days.

(21) Appl. No.: 09/885,977

(22) Filed: Jun. 22, 2001

(65) Prior Publication Data

US 2004/0029638 A1 Feb. 12, 2004

Related U.S. Application Data

(60) Provisional application No. 60/252,468, filed on Nov. 22, 2000, provisional application No. 60/283,377, filed on Apr. 13, 2001, provisional application No. 60/276,056, filed on Mar. 16, 2001, and provisional application No. 60/283,381, filed on Apr. 13, 2001.

(51) Int. Cl.[7] ............................................. G06F 17/00
(52) U.S. Cl. ................. 455/518; 455/412.1; 455/414.1; 463/39; 463/40; 463/42
(58) Field of Search ................................. 455/566, 412, 455/414.1, 518, 412.1, 414.2; 463/40, 39, 42

(56) References Cited

U.S. PATENT DOCUMENTS

| 5,848,396 A | 12/1998 | Gerace |
| 5,852,775 A | 12/1998 | Hidary |
| 5,991,735 A | 11/1999 | Gerace |
| 6,050,898 A | 4/2000 | Vange et al. |
| 6,055,510 A | 4/2000 | Henrick et al. |

(Continued)

FOREIGN PATENT DOCUMENTS

| EP | 1066867 A2 | 1/2001 |
| EP | 1066868 A2 | 1/2001 |
| EP | 1086732 A1 | 3/2001 |
| EP | 1087323 A1 | 3/2001 |

*Primary Examiner*—Nick Corsaro
*Assistant Examiner*—Alan T. Gantt
(74) *Attorney, Agent, or Firm*—Reed Smith LLP

(57) ABSTRACT

The present invention is directed to a system and method for managing state information related to an interactive application to accommodate one or more users participating in an interactive application session, wherein the state information comprises local state information specific to each of the one or more user's unique view of the interactive application and global state information. The system of the present invention may comprise a telecommunications network; an application server in communication with the telecommunications network for managing the global state information relative to all of the users participating in the interactive application session; and at least one mobile client device in communication with the application server over the telecommunications network for managing the local state information for each of the one or more users. The method of the present invention may comprise the steps of structuring the state information for optimized delivery over the telecommunications network; and transferring the state information over the telecommunications network.

13 Claims, 15 Drawing Sheets

U.S. PATENT DOCUMENTS

| | | | |
|---|---|---|---|
| 6,078,789 A | 6/2000 | Bodenmann et al. | |
| 6,113,494 A | 9/2000 | Lennert | |
| 6,134,532 A | 10/2000 | Lazarus et al. | |
| 6,157,841 A | 12/2000 | Bolduc et al. | |
| 6,181,927 B1 | 1/2001 | Welling, Jr. et al. | |
| 6,208,866 B1 | 3/2001 | Rouhollahzadeh et al. | |
| 6,216,129 B1 | 4/2001 | Eldering | |
| 6,223,291 B1 | 4/2001 | Puhl et al. | |
| 6,383,075 B1 | 5/2002 | Jeong et al. | |
| 6,416,414 B1 | 7/2002 | Stadelmann | |
| 6,524,189 B1 * | 2/2003 | Rautila | 463/40 |
| 6,785,561 B1 * | 8/2004 | Kim | 455/566 |
| 2001/0005839 A1 | 6/2001 | Maenpaa et al. | |
| 2001/0011248 A1 | 8/2001 | Himmel et al. | |
| 2001/0013037 A1 | 8/2001 | Matsumoto | |
| 2001/0014911 A1 | 8/2001 | Doi et al. | |

* cited by examiner

| BIT NUMBER LOCATION | DoF VARIABLE LIBRARY | MAPPED GAME OBJECT LIBRARY |
|---|---|---|
| X + 1 | | |
| X + 2 | DoF CLASS A | A = OBJECT + A DoF 1 |
| X + 3 | | |
| .. | | |
| — | | |
| .. | DoF CLASS B | |
| — | | |
| .. | | |
| — | DoF CLASS C | |
| .. | | |
| — | | |
| .. | DoF CLASS D | |
| — | | |
| .. | | |
| — | | |
| .. | | |
| — | | |
| N - (Y + 1) | DoF CLASS Z | Z = OBJECT N DoF N |

FIG. 8

METHOD AND SYSTEM FOR IMPROVING THE EFFICIENCY OF STATE INFORMATION TRANSFER OVER A WIRELESS COMMUNICATIONS NETWORK

This Application claims priority on: U.S. Provisional Patent Application Ser. No. 60/252,468, for Method and System for Providing Interactive Services Over a Wireless Communications Network, filed Nov. 22, 2000; U.S. Provisional Patent Application Ser. No. 60/283,377, for Method and System for Mediating Interactive Services Over a Wireless Communications Network, filed Apr. 13, 2001; U.S. Provisional Patent Application No. 60/276,056, for Method and System for Content Distribution Over a Wireless Communications System, filed Mar. 16, 2001; and U.S. Provisional Patent Application Ser. No. 60/283,381, for Method and System for Improving the Efficiency of State Information Transfer Over a Wireless Communications Network, filed Apr. 13, 2001; each of which is incorporated herein by reference, as if fully set forth herein.

FIELD OF THE INVENTION

The present invention relates to a system and method for improving the efficiency of state information transfer over a network. In particular, the present invention preferably relates to optimizing the structure and method of transmission of degrees of freedom information in a multi-player, interactive game over a wireless communications network.

BACKGROUND OF THE INVENTION

On-line entertainment has been popular for several years. Typically, users connect to the Internet through their desktop computers and enjoy computer-hosted games ranging from simple board games, like backgammon, to more complex and graphic intensive adventure games. Recently, developments in technology have enabled users to engage in multi-player, interactive gaming sessions with other users who may be scattered across the globe. The ability to play a game with friends, and even strangers, who are not similarly located creates an exciting outlet for gaming aficionados.

Although in its infancy, interactive gaming has become available to users over a wireless network. Using their mobile handset as a game controller, users play games with other players not in their area without being tied down to their desktop computer. The thrill of interactive gaming coupled with the convenience of being able to play anywhere through your mobile handset makes wireless interactive gaming a very exciting, and potentially profitable, opportunity for operators of wireless networks.

Interactive gaming over a wireless network, however, is not without its disadvantages. Latency and data transmission delays create performance issues when gaming over any network but are especially troublesome over wireless communication networks. Many known systems attempt to solve latency issues by offering only simplistic games with no or low quality graphics that are unaffected by communication delays. These systems, however, significantly depreciate the user's gaming experience. In addition, many known wireless interactive gaming systems are not truly interactive and require users to actually be within a certain range from one another. Other known systems tax network capacity and waste network resources to such a degree that network operators must charge users prohibitively high service fees to avoid significant losses.

Others have attempted to provide multi-player, interactive gaming over a network. For example, U.S. Pat. No. 6,050,898 to Vange, et al., discloses a computer-based interactive gaming system that uses a method for initiating and scaling a massive concurrent data transaction. Vange discloses a system and method for optimizing the transmission of computer-hosted game information over a telecommunications link, such as the Internet.

European Patent Application No. 00660125.6, filed by Nokia Corporation, discloses a multi-player game system using a mobile telephone and game unit. The application discloses using a mobile phone to download a game to separate game units and linking the multiple users using a low power radio link.

European Patent Application No. 00660161.1, filed by Nokia Corporation, discloses a system for profiling mobile station activity in a predictive command wireless game system. The application discloses a system and method for customizing an interactive, text-based game based on mobile station activity.

Although many of the prior known gaming systems claim to offer an enhanced, interactive gaming experience, none of the prior known systems of which the present inventors are aware offer: (1) a fully interactive gaming experience; (2) over a truly wireless network; (3) with high resolution graphics; (4) while efficiently using network resources; and (5) offering those services at a low, fixed, monthly service charge, that is not based on minutes of use.

The present invention addresses the problem of how to deliver an enhanced, interactive game experience, efficiently and cost effectively. In particular, the system and method of the present invention offers a real-time, interactive experience and improves control over the transfer of game state information. Preferably, by controlling degrees of freedom information and managing the network traffic more efficiently than prior known systems, the present invention conserves network capacity and offers the network operator cost savings advantages. This enables the operator to provide a more enhanced interactive gaming experience with the same amount of network resources. This also creates the possibility of providing a wireless game service to end users at a flat monthly rate rather than on a "per unit of time" basis. In this regard, the present invention is preferably adapted to the pricing model of Assignee's Cricket™ wireless telecommunications services.

OBJECTS OF THE INVENTION

It is therefore an object of the present invention to overcome shortcomings of prior known interactive gaming systems.

It is another object of a preferred embodiment of the present invention to improve the efficiency of transfer of state information for interactive wireless services.

Another object of a preferred embodiment of the present invention is to improve the quality of wireless interactive gaming systems.

A further object of a preferred embodiment of the present invention is to reduce the operations cost of delivering interactive applications over a wireless communications network.

An additional object of a preferred embodiment of the present invention is to reduce the degree to which interactive wireless services are network dependent.

Another object of a preferred embodiment of the present invention is to reduce the degree to which interactive wireless services are time of day dependent.

A further object of a preferred embodiment of the present invention is to increase the availability of interactive wireless services.

An additional object of a preferred embodiment of the present invention is to more efficiently use network capacity for interactive wireless gaming applications.

Another object of a preferred embodiment of the present invention is to reduce the cost of bandwidth used to deliver interactive services.

Another object of a preferred embodiment of the present invention is to manage degrees of freedom necessary to render an interactive application on a personal handheld device and on network server components in order to reduce wireless communications traffic required to operate the interactive application.

An additional object of a preferred embodiment of the present invention is to adapt the wireless transmissions between the network and the personal device to reduce latency.

Another object of a preferred embodiment of the present invention is to minimize the amount of information transmitted between the network and the personal client access device in order to update the state of the interactive application.

A further object of a preferred embodiment of the present invention is to limit the latency of the response of an interactive application.

A further object of a preferred embodiment of the present invention is to provide interactive services at a cost that varies as a function of available bandwidth or other network resources.

Yet another object of a preferred embodiment of the present invention is to increase the perceived speed of interactive use.

An additional object of a preferred embodiment of the present invention is to reduce the differences in latency between users of the interactive service.

Another object of a preferred embodiment of the present invention is to achieve a consistent level of latency between users of the interactive service.

A further object of the present invention is to create an even playing field for interactive services.

An additional object of the present invention is to provide a more cost-effective way to deliver interactive services to end users.

Additional objects and advantages of the invention are set forth, in part, in the description which follows and, in part, will be obvious from the description or may be learned by practice of the invention. The objects and advantages of the invention will be realized in detail by means of the instrumentalities and combinations particularly pointed out in the appended claims.

BRIEF SUMMARY OF THE INVENTION

As illustrated in the accompanying diagrams and disclosed in the accompanying claims, the present invention is a system for defining, interpreting, and managing state information related to an interactive application to accommodate one or more users participating in an interactive application session. The present invention preferably comprises: a communications network; one or more client access devices; and server means, adapted to manage degrees of freedom of an interactive application or service. The communications network preferably is a wireless communications network; further comprising: at least one base station; at least one base station controller; and at least one mobile switching center.

In a preferred embodiment, the system of the present invention comprises: a wireless communications network; an application server in communication with said wireless communications network for managing the global state information relative to all of the users participating in the interactive application session; and at least one mobile client device in communication with said application server over said wireless communications network for managing the local state information.

In an alternate preferred embodiment, the present invention comprises: an interactive application server for managing global state information related to an interactive application relative to local state information received from one or more mobile client devices over a wireless communications network during an interactive application session. The server preferably comprises: communication means for receiving the local state information from the one or more mobile client devices; global modeler means for comparing the received local state information with the global state information to produce updated information and updating the global state information with the updated information; and server state manager means for structuring the updated state information for optimized delivery over the wireless communications network; wherein said communication means delivers the updated state information to said one or more mobile client devices. The server state manager preferably structures the updated state information based on degrees of freedom associated with the interactive application.

In an alternate preferred embodiment, the present invention is a mobile client device for managing local state information related to an interactive application relative to global state information maintained by an application server during an interactive application session between one or more users over a wireless communications network. The mobile client device of the present invention preferably comprises: local modeler means for comparing the local state information to the global state information, wherein the differences between the local state information and the global state information comprise changed state information; client state manager means for structuring the changed state information for optimized delivery over the wireless communications network; synchronization means for synchronizing the changed state information relative to the global state information; and communication means for delivering the changed state information to the application server. The client state manager preferably structures the changed state information based upon degrees of freedom associated with the interactive application. The mobile client device of the present invention preferably further comprises: memory means for storing the interactive application; and input/output means for interfacing with the interactive application.

As embodied herein, the present invention preferably further comprises a method and system for improving the management of state information transfer for an interactive application over a wireless communications network. The present invention preferably comprises a method and system for determining the instruction set necessary to render the interactive application; determining degrees of freedom based on that instruction set; reducing either the instruction set and/or the degrees of freedom to the minimal number of degrees of freedom and/or instructions necessary to render the interactive application; and synchronizing the users with respect to one another and with respect to the interactive application.

As embodied herein, the instruction set is preferably determined based upon a number of parameters, comprising one or more of the following: the features and characteristics of the wireless access device; the version of the interactive application; the user preferences and/or characteristics; the control protocols and methodologies employed; and the features and characteristics of the interactive application.

In a preferred embodiment of the present invention, the degrees of freedom are determined based upon a number of factors comprising one or more of the following: degrees of freedom may be layered to enhance the efficiency of the state information transfer; a metaset of degrees of freedom may be employed to compile various subroutines needed to perform various actions in the interactive application; sheets could be reduced to a single or a limited number of degrees of freedom; degrees of freedom could encompass single or multiple actions of the characters of the interactive application; actions could be combined, as many degrees of freedom be combined to an additional degree of freedom; degrees of freedom coding for various functions could be grouped or broken out as appropriate to provide flexibility as well as efficiency in updating state information; and special degrees of freedom could be created specifically for certain complex actions in the game that would otherwise require the transfer of substantial state information over the air interface.

Degrees of freedom may also be set subject to limits. Limits may be independent, based upon rules for the interactive application, or determined based upon various features of the system, such as features of: the wireless communications network; the application; or the user's access device. Degrees of freedom may also be device-specific, such as: graphics; sounds; scents; temperature; vibrations; force; or other physical properties. The degrees of freedom may also be modified based upon features that will improve the efficiency of use of the air interface, such as adjusting: the frame rate; frame size; data rate; and packet definition. In a preferred embodiment of the present invention, degrees of freedom may also be determined based upon the functionality of projectiles employed in the interactive application.

In a preferred embodiment of the present invention, the instruction set and/or the degrees of freedom are reduced to enhance the efficiency of the transfer of state information over the air interface. This can be accomplished either by reducing the initial instruction set to the minimum required before mapping degrees of freedom, or by determining degrees of freedom based on a preferred instruction set and then reducing the degrees of freedom to the minimum required to provide the desired functionality of the interactive application. Further, the system and users are preferably synchronized.

It is to be understood that both the foregoing general description and the following detailed description are exemplary and explanatory only, and are not restrictive of the invention as claimed. The accompanying drawings, which are incorporated herein by reference, and constitute a part of the specification, illustrate certain embodiments of the invention, and together with the detailed description, serve to explain the principles of the present invention.

BRIEF DESCRIPTION OF THE DRAWINGS

The present invention will now be described in connection with the following figures in which like reference numbers refer to like elements and wherein:

FIG. 8 is a Table mapping bit locations to a degree of freedom library and game object library of a preferred embodiment of the present invention;

DETAILED DESCRIPTION OF THE PREFERRED EMBODIMENTS

Reference will now be made in detail to a preferred embodiment of the system and method of the present invention, examples of which are illustrated in the accompanying drawings. An embodiment of the interactive application system 10 of the present invention is shown in FIG. 1. In a preferred embodiment of the present invention, the interactive application carried out on the system is an interactive game adapted to be played by one or more users.

System of a Preferred Embodiment of the Present Invention

Figure 1A:
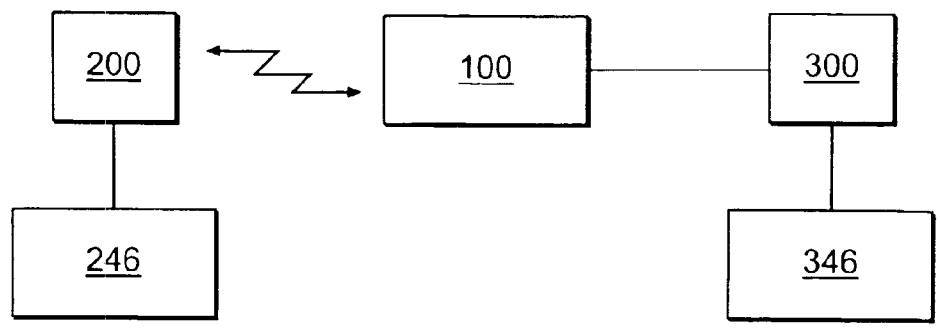
FIGS. 1a and 1b are schematic diagrams illustrating a system of the present invention.

As depicted in FIG. 1a, the present invention is adapted for use in conjunction with a telecommunications network 100, at least one mobile game client 200 in communication with the telecommunications network 100, and a mobile game server 300 in communication with the telecommunications network 100. As embodied herein, degree of freedom management means 246 and 346 cooperate with one or both of the mobile game client 200 and the mobile game server 300 to manage degrees of freedom information of an interactive application.

Figure 1B:
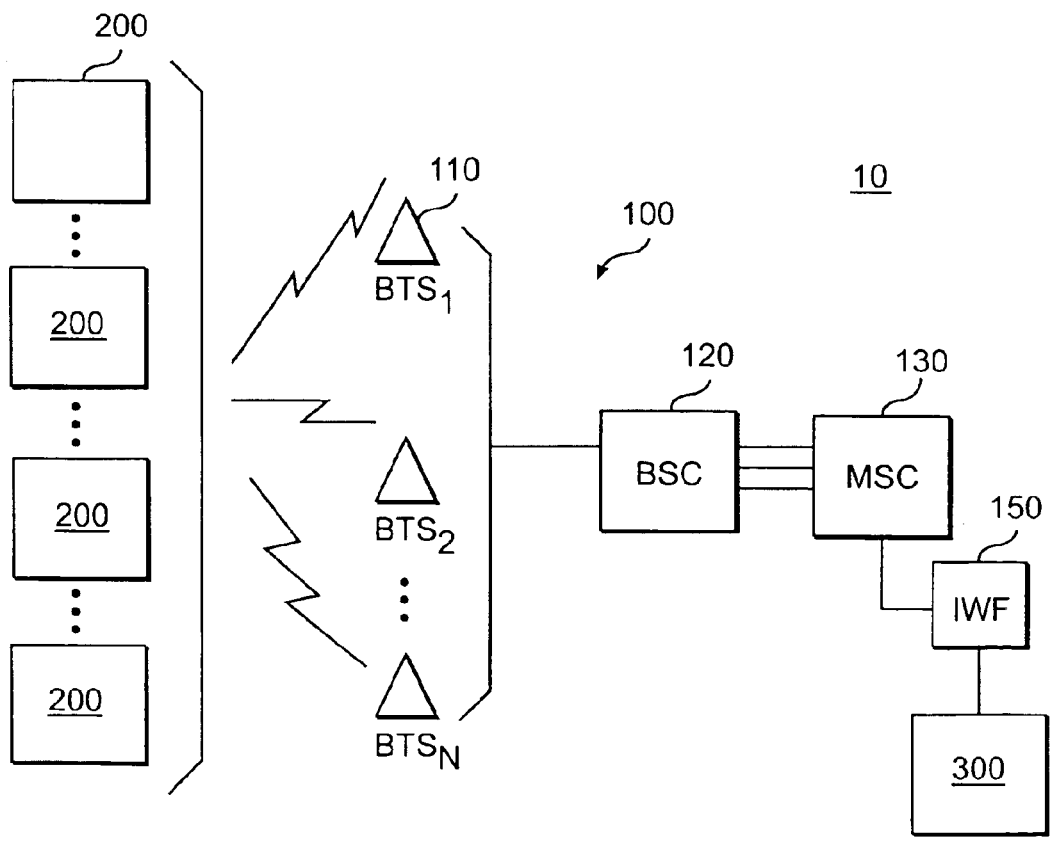

In the preferred embodiment of the present invention, as shown in FIG. 1b, the telecommunications network 100 is a wireless communications network. Other suitable embodiments of the telecommunications network 100 of the present invention, include, but are not limited to: Plain Old Telephone Service (POTS); Public Switched Telephone Network (PSTN); Integrated Services Digital Network (ISDN); Asymmetric Digital Subscriber Lines (ASDL); any of various other types of Digital Subscriber Lines (xDSL); Public Land Mobile Network (PLMN); the Internet; cellular; Global System Mobile (GSM); General Packet Radio Services (GPRS); Infrared Data Association (IrDA); Cellular Digital Packet Data (CDPD); Enhanced Data Rates for Global (or GSM) Evolution (EDGE); Universal Mobile Telecommunications System (UMTS), Ricochet proprietary wireless packet network; wireless local loop (WLL); Wireless Local Area Network (WLAN); 802.11; infrared; Bluetooth; Wide Area Network (WAN); Local Area Network (LAN); Optical; Line of Sight; satellite-based systems; Cable; User Datagram Protocol (UDP); SMR (walkie talkies); any portion of the unlicensed spectrum; wireline networks; and/or any other suitable telecommunications network 100. Any communications network is considered to be within the scope of the present invention, provided it is adapted to render the interactive application to the user, as described herein.

The interactive system 10 of the present invention is preferably adapted for use in conjunction with a wireless communications network 100 that is data capable, as opposed to a first generation cellular (voice only) network. The present inventors anticipate that the wireless network 100 is preferably based upon PCS, TDMA, CDMA, CDPD, CDMAone, or any other suitable technology(ies) or standard(s) that are data capable.

The wireless communications network 100 further comprises at least one base station (BTSs) 110, at least one base station controller (BSC) 120, and at least one mobile switching center (MSC) 130. Each base station 110 includes a transceiver capable of transmitting signals to and receiving signals from the mobile game clients 200. In addition, as will be apparent to those of ordinary skill in the art, each base station 110 is connected through the BSC 120 to the MSC 130. The MSC 130 is in communication with the mobile game server 300 through the IWF 150. The IWF includes, as is apparent to those of ordinary skill in the art, the necessary equipment and conversion algorithms to permit seamless communication between the MSC 130 and the mobile game server 300, despite potentially dissimilar protocols supporting each of those components. In the preferred embodiment of the present invention, the IWF comprises an "L" interface. Accordingly, the wireless communications network 100 is adapted to allow communication between the mobile game clients 200 and the mobile game server 300.

It will be apparent to persons of ordinary skill that various modifications and variations may be made in the present invention without departing from the scope or spirit of the invention. For example, the mobile game server 300 could be deployed as a separate server component or as a server farm. Alternatively, the mobile game server 300 and the functions it performs, could be incorporated in any suitable location in the network 100. Thus, it is intended that the invention cover the variations and modifications of the invention provided they come within the scope of the appended claims and their equivalents.

Figure 2:
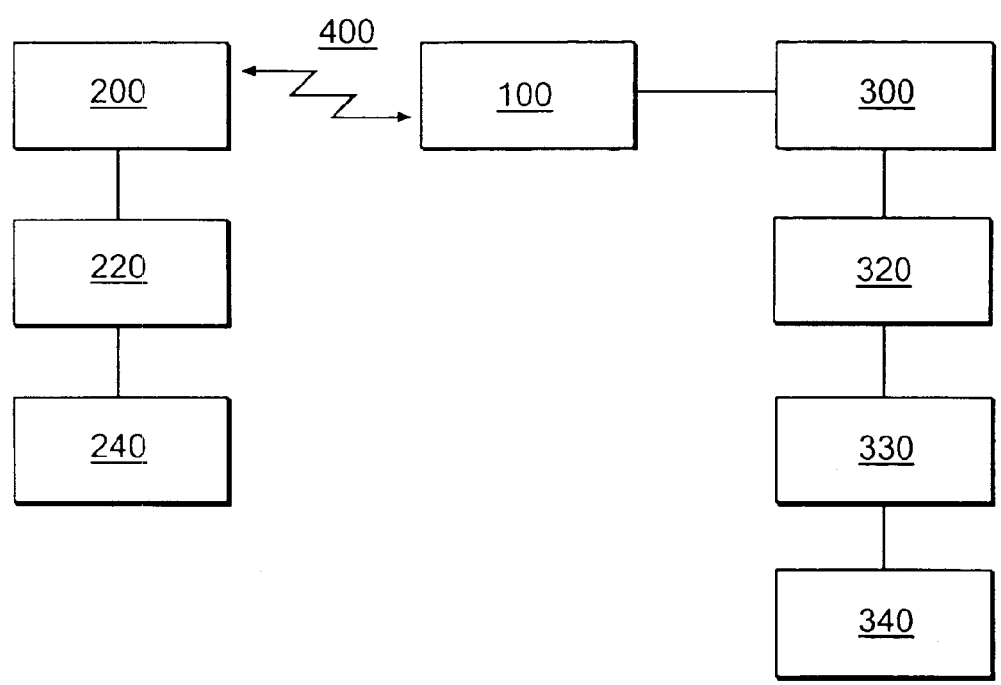
FIG. 2 is a block diagram illustrating a system of a preferred embodiment of the present invention.
Figure 9:
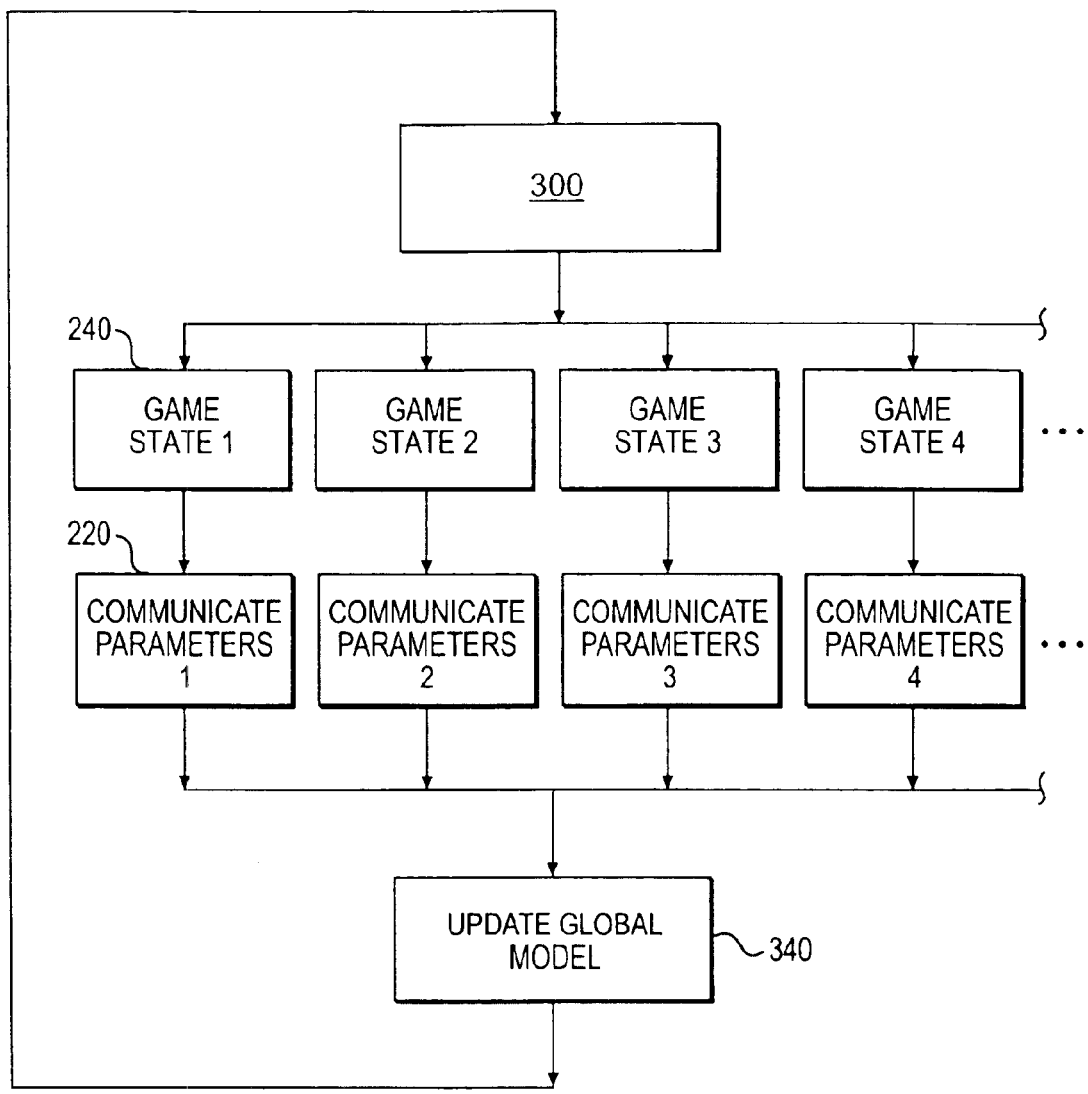
FIG. 9 is a flowchart depicting a method of a preferred embodiment of the present invention to determine state and establish parameters for one or more local client devices and communicate that information to a server to update a global model common to the clients.

FIG. 2 depicts an alternative preferred embodiment of the present invention. As shown in FIG. 2, the present invention comprises: the network 100; the at least one mobile game client 200; the mobile game server 300; and the interactive application 400. The mobile game client 200 preferably further comprises a client session management means 240 and a client communication means 220. The mobile game server 300 preferably further comprises server communication means 320; server synchronization means 330; and server session management means 340. In an alternative preferred embodiment of the method of the present invention, as shown in FIGS. 9 and 11, the system of the present invention as depicted in FIG. 2 is adapted to determine the state of the client device through the client session management means 240 and to communicate that information to the network 100 through the client communication means 220. Similarly, as shown in FIGS. 9 through 14, the server 300 is adapted to synchronize the mobile game client(s) 200 with the interactive application and the server 300 through the server synchronization means 330; analyze and determine the degrees of freedom for each user of the application through the server session management means 340; and communicate information back to each of the mobile game client(s) 200 through the server communication means 320.

Figure 3A:
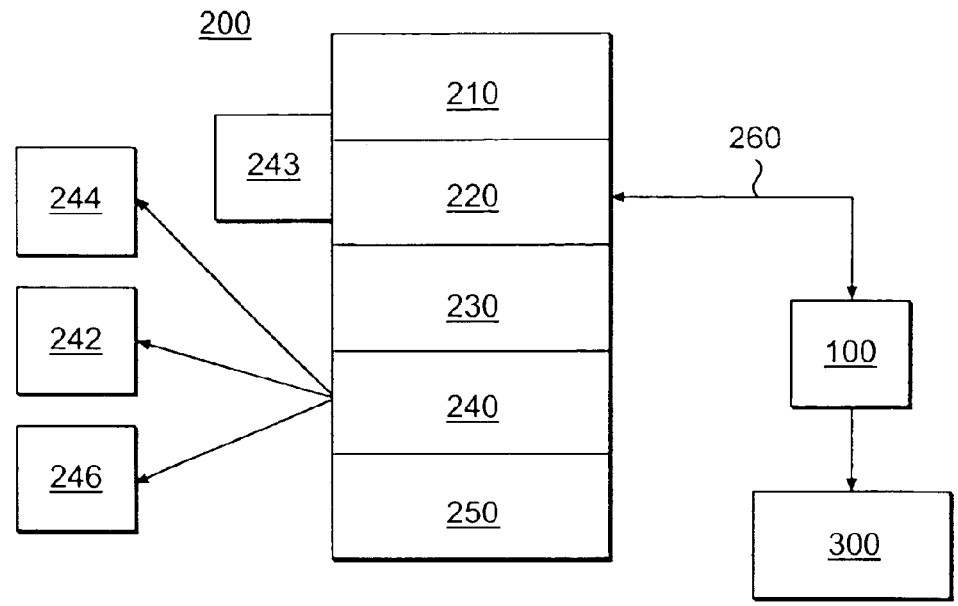
FIGS. 3a and 3b are block diagrams illustrating a client device (3a) and a game server (3b), of a system of a preferred embodiment of the present invention.
Figure 3B:
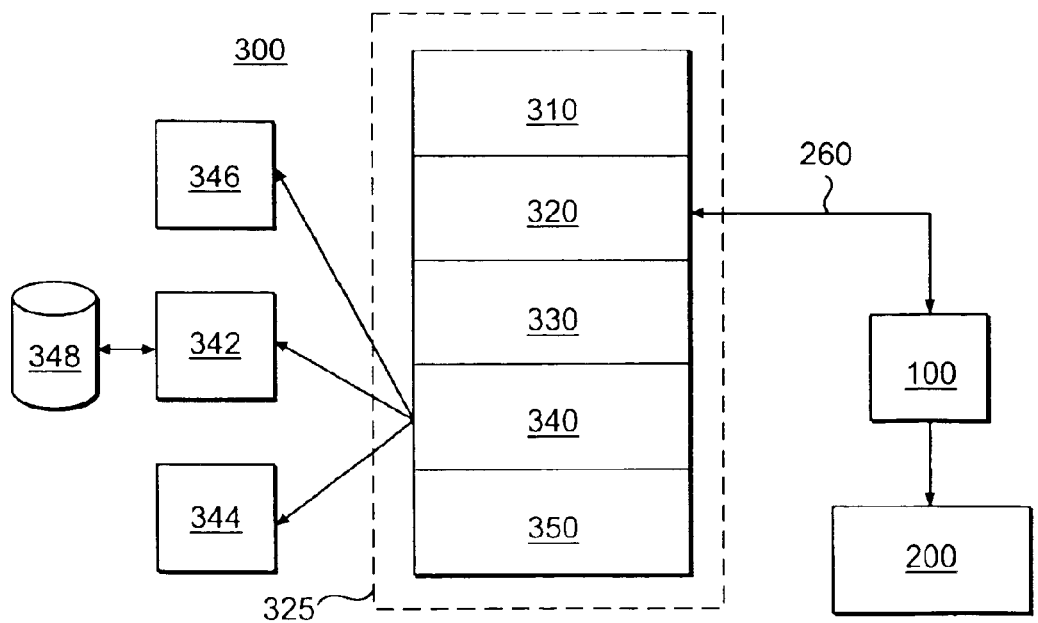

Alternative preferred embodiments of the system of the present invention are shown in FIGS. 3a and 3b. As shown in FIGS. 3a and 3b, the present invention comprises the network 100; at least one mobile game client 200; and the mobile game server 300. In alternative preferred embodiment of the present invention, the mobile game client 200 further comprises an operating system 210; the client communication means 220; a client system clock 230; the client session management means 240; and a client application (API) 250. In a preferred embodiment of the present invention, the client session management means 240 of the present invention further comprises a game application 242; a client memory means 243; a local modeling means 244; and the client degree of freedom (DOF) management means 246.

In an alternate preferred embodiment of the present invention, as shown in FIG. 3b, the mobile game server 300 further comprises: an operating system 310; the server communication means 320; a server synchronization means 330; the server session management means 340; and a server application programming interface (API) 350. In a preferred embodiment of the present invention the server session management means 340 further comprises: a host game 342; an object library 348 cooperating with the host game 342; a global modeling means 344 for reconciling the state of the application between all users and the application; and the server degree of freedom (DOF) management means 346.

As embodied herein, the mobile game client 200 is any user device that is adapted to interface with the wireless communications network 100 to provide a multi-player, interactive game. In a preferred embodiment, the mobile game client 200 is a mobile phone. Other embodiments of the mobile game client 200, include without limitation: personal digital assistant (PDA); pager; wireless game controller; and/or an email device. These types of variations are considered well within the scope of the present invention.

With reference to FIG. 3a, a preferred embodiment of the mobile game client 200 will now be described in detail. The mobile game client 200 preferably comprises: the operating system 210, the client communication means 220, the client synchronization means 230, the client session management means 240, the client application programming interface (API) 250, and client input/output means (not shown) for interacting with the game player. The client input/output means may include, for example, a mobile phone keypad, headphones, earphones, cables, joysticks, paddles, cameras, microphones, and/or speakers. As will be apparent to those of ordinary skill in the art, the client API 250 preferably further comprises the necessary routines, protocols, and tools to enable the components of the mobile game client 200 to interact and to enable operation within the wireless network 100. The mobile game client 200 communicates with the wireless communications network 100 over a wireless connection protocol 260.

As shown in FIG. 3*a*, the mobile game client 200 includes the operating system 210. The operating system 210 is any platform capable of supporting the multi-player, interactive gaming system 10 of the present invention, such as, for example, Palm, Windows, Java, Symbian, Macintosh compatible, and/or other operating systems adapted for use with the present invention. The operating system 210 manages the input and output of data and the interface between the various components of the mobile game client 200.

In the preferred embodiment of the present invention, the client communication means 220 comprises communication software, in cooperation with the operating system 210. The communication means 220 communicates game state information, which has been optimized to efficiently utilize the limited bandwidth of the wireless communications network 100, to and from the mobile game server 300 over the wireless communications network 100. The communication means 220 packages and unpackages game information according to instructions received from the client DOF management means 246 and the server DOF management means 346 (discussed below). In the preferred embodiment of the present invention, local game information comprises UDP data packets. The use of other protocols for packeting and transporting the local game information, such as, for example, TCP/IP, IP, IP Mobile, or any other suitable protocol(s) is considered to be well within the scope of the present invention.

As shown in FIG. 3*a*, the mobile game client 200 further includes the client synchronization means 230, cooperating with the communications means 220. The client synchronization means 230 is preferably a client system clock adapted to time stamp the game information that is communicated with the mobile game server 300 over the wireless communications network 100. As will be apparent to those of ordinary skill in the art, the client synchronization means 230 enables the state of game play to be synchronized between all users of interactive gaming system 10. The synchronization means 230 of the present invention preferably is an improvement over known, Internet-based gaming systems. The time management system inherent in a wireless network, such as, for example, a CDMA network, is more precise than that typically employed over IP-based networks. This time management system is preferably embedded in the mobile game client 200, and, therefore, all mobile game clients 200 participating in a particular interactive session are synchronized with each other and with the mobile game server 300.

The client session management means 240 manages the state, event, and behavior of the interactive game being played on the mobile game client 200. In the preferred embodiment, the client session management means 240 of the present invention further comprises: the game application 242, the local modeling means 244, and the client degrees of freedom (DOF) management means 246. The client session management means is preferably an algorithm for managing the interactive application (gaming) session and all game objects at the client level. The client session management means 240 controls the functioning of the game application 242, the local modeling means 244, and the client DOF management means 246.

The game application 242 is game software that resides on the mobile game client 200. The game application 242 comprises the application of the host game application 342 (discussed below) that resides on the mobile game server 300. The game application 242 comprises the software necessary to provide all of the functions and features of the particular interactive application it describes. The game application 242 is executed by the mobile game client 200 and adapted to receive the input and provide the output necessary for the user to play an interactive game at the mobile game client 200.

The game application 242 is preferably stored on the mobile game client 200 via the memory means 243. As apparent to those of ordinary skill in the art, the memory means 243 comprises, for example, a memory chip, a plug-in module, solid state memory, Sandisk memory media, "flash" memory, such as a Sony memory stick, or any other memory means capable of supporting the game application 242 and capable of receiving and storing updates from the mobile game server 300 and input/output from the client input/output means.

In the preferred embodiment of the present invention, the local modeling means 244 is an algorithm designed to model the local game state. The term "game state" is generally meant to describe a current snapshot, at any given time, of the position, timing, and nature of gameplay for all game objects that are under the influence of a player's interactive "choice" in an interactive game experience. The exercise of choice by the player operates within the physics that controls the relationship between game objects in the interactive application. The local modeling means 244 examines the data associated with the particular state of the game at the mobile game client 200. For any given game state, this data may include, for example, a character's current position in the virtual game space (which could be two- or three-dimensional), the items the character is carrying, whether the character is moving, and/or the direction and rate at which the character is moving. The data that defines the game state is dependent on the particular game application 242.

The local modeling means 244 recognizes any changes that occurred in the local game state, with focus on the mobile client player's variably defined area of controlled space relative to the last updated global game state. The global game state is managed by the mobile game server 300 and is defined as the game view shared by all players. The local game state is the game parameter controlled space, or "sphere of influence," that each client player currently occupies. The local game state will differ for each player at each mobile game client 200. In addition, the size and scope of the local game state is flexibly defined depending on the interactive application or game involved. For example, the local game state may involve a two-dimensional view or a three-dimensional view. Any interactions between the player and the game application 242 at the mobile game client 200 (through the client input/output means) changes the state within that localized sphere of influence. The client session management means 240 collects the change of state information from the local modeling means 244 and implements the client DOF management means 246.

In the preferred embodiment, the client DOF management means 246 is an algorithm stored on the mobile game client 200. The client DOF management means 246 preferably is designed to structure (encode) the change of game state information recognized by the local modeling means 244 in a manner that can be communicated to the mobile game server 300 and that efficiently utilizes the limited bandwidth of the wireless network 100. The mobile game server 300 receives the coded, changed game state information from each of the mobile game clients 200 in the gaming session, decodes the information, updates the global model, and returns the necessary information to update each mobile game client 200 relative to the global game state.

The client DOF management means 246 efficiently structures the change of game state information by optimizing the degrees of freedom information that is transmitted over the network. Simply put, the client DOF management means 246 provides a "shorthand" description of any changes in the local game state that minimizes the amount of information delivered across the network 100 without compromising the enhanced, realistic feel of the interactive application.

At a high level, for example, the present inventors anticipate that a number of methods may be used to reduce the amount of information necessary to enable the interactive gaming system 10. Instruction sets may be layered. In this manner, sets of instructions may be grouped together in a logical fashion in order to reduce the amount of air traffic necessary to actuate the movement of a game piece. For example, if the change in local state information recognized by the local modeling means 244 includes the movement of a character that is running, the information could be broken into several series of actions. Instructions could then be layered depicting groups of those actions. The arm movement could be depicted in one series of instructions; leg movement could be depicted in another; and movement of the character horizontally and/or vertically could be depicted in yet other layers of instructions.

Similarly, multiple sets of instructions may be collapsed into a single instruction. Although this would require creating a number of codes that represent the various actions the character could maintain, it would offer the potential for dramatically reducing the amount of air interface traffic required to actuate the game. For example, various of the actions involved in the game could be reduced to a single subroutine. Activities such as running, jumping, throwing, crawling, could each be reduced to a single instruction set so that a single instruction transmitted to the mobile game server 300 could define a series of actions corresponding to the local change of game state information.

Furthermore, the client DOF management means 246 may efficiently manage spawned degree of freedom information, such as, for example, projectile information. In an interactive gaming application where a projectile, such as, a missile, a bullet a rope, an arrow, etc., is transmitted, the system must track movement of two discrete objects (the projectile and the image throwing it). Prior known systems deliver multiple sets of instructions across the air interface. Other systems deliver only one set of movement instructions, leading to a less realistic gaming experience. In the present invention, the trajectory of the projectile is calculated at the client DOF management means 246, based on formulas or other data subject to depict movement of the projectile. The calculations, and the formulas required to make the calculations, are game specific and are part of the game application 242.

For example, when the local change of game state information indicates that a ball has been thrown, the client DOF management means 246 preferably evaluates the trajectory that the ball will take, rather than sending and receiving multiple instructions over the network depicting each stage of movement of the ball. This prevents the present invention from tying up valuable network capacity.

In an embodiment of the present invention where color is used, color may be defined as a degree of freedom. Accordingly, the local change of game state information may be reduced by controlling the transmission of color according to any one or more of the methods for controlling degrees of freedom and state information discussed above.

For example, the facial color of a character in a particular game application 242 may be defined by one degree of freedom with three states (e.g., orange, red, and purple). The client DOF management means 246 may define and structure any local change in the facial color such that only the state of the facial color needs to be transmitted over the air interface. When the character's face becomes bruised, for example, the client DOF management means 246 describes "purple" state information only, rather than describing the change in terms of the entire face, which would require more network bandwidth to transmit.

With reference to FIG. 3b, a preferred embodiment of the mobile game server 300 will now be described in detail. The mobile game server 300 preferably comprises: the operating system 310; the server communication means 320; the server synchronization means 330; the server session management means 340; and the server application programming interface (API) 350. As apparent to those of ordinary skill in the art, the server API 350 provides an interface between the server communication means 320 and the server session management means 340.

In a preferred embodiment of the present invention, a mobile entertainment services platform 325 is adapted to support the mobile game server 300 and other entertainment services servers, including, but not limited to: servers adapted to provide user profiling; voice-over-packet services; Web browsing; and/or interactive community services; such as those disclosed in Assignee's, U.S. Non-Provisional patent application Ser. No. 09/833,656, entitled "Method and System to Facilitate Interaction Between and Content Delivery to Users of a Wireless Communications Network," filed Apr. 13, 2001, which is incorporated herein by reference as if fully set forth herein.

Each of the components of the game server 300 functions similarly to the corresponding component on the mobile game client 200. For example, as shown in FIG. 3b, the game server 300 includes an operating system 310. As discussed in conjunction with the mobile game client 200, the operating system 310 is any platform capable of supporting the multi-player, interactive gaming of the present invention.

In the preferred embodiment of the present invention, the server communication means 320 includes communication software, in cooperation with the operating system 310. The server communication means 320 communicates global game state information to and receives local game state information from each of the mobile game clients 200 over the wireless communications network 100. Similar to the client communication means 220, the server communication means 320 packages and unpackages the game information according to instructions received from the server DOF management means 346.

As shown in FIG. 3b, the game server 300 further includes the server synchronization means 330. The server synchronization means 330 preferably includes a server system clock 332 and a means 334, such as an algorithm or software, adapted to operate the system clock 332 and to time stamp the global game information that is communicated with the mobile game clients 200 over the wireless communications network 100.

The server session management means 340 manages the state of the interactive game being played on all of the mobile game clients 200. In the preferred embodiment, the server session management means 340 of the present invention further comprises: the host game application 342, the global modeling means 344, the game object library 348, and the server DOF management means 346. The server session management means 340 preferably is an algorithm for controlling the functioning of and interface to the game application 342, the game object library 348, the global modeling means 344, and the server DOF management means 346. The server session management means 340 manages the gameplay of all logged on users for a given interactive game application. The primary functions performed by the server session management means 340 preferably include: registration functionality for maintaining all session statistics of all game objects; responsibility functionality for managing requests for all active, or "in-play" objects; persistence functionality for controlling and maintaining permanent records of the "state" of all game objects utilized in a game session; arbitration functionality for determining the current "state" of game objects; estimation functionality for estimating the true "state" of game objects in active game play; and reconciliation functionality for reconciling, or smoothing, the errors between the "estimated" and the actual "state" of the global objects based on the latest synchronization of the global game view.

The host game application 342 is game software that resides on the mobile game server 300 and is controlled by the server session management means 340. The host game application 342 parallels the client game application 242 and may include software describing any game application, ranging from simplistic board games to complex, graphic intensive action and adventure games.

In the preferred embodiment of the present invention, the game object library 348 is a database for storing a list of all relevant objects that comprise the interactive application. The game object library 348 contains the entire list of objects that defines, populates and creates the game play experience. All objects are grouped by their appearance or nature within the game construct. Object groups include, but are not limited to, mobile client interface, client device input, graphics, communications, game session, and other groups that are appropriate given the type and genre of the game application. Within each object group there are object families. For example, within the game session group, depending on the type or nature of game play, there would be object families for movement, trajectory, sound, color shifts (explosions), characters, tools, weapons, collectibles, spells, instruments, etc. The game object library 348 preferably cooperates with the server session management means 340. The server session management means 340 accesses the game object library 348. The server session management means 340 performs the rendering of instructions and the management of a game's entire object list for all logged on players in a particular game session.

In the preferred embodiment of the present invention, the global modeling means 344 is an algorithm designed to model the global game state. After the server communication means 320 receives and decodes the change of state information from each of the mobile game clients 200, the global modeling means 344 updates the global game state based on this information.

The server DOF management means 346 preferably is an algorithm stored on the mobile game server 300. The server DOF management means 346 employs essentially the same algorithm data structuring methods that are used by the client DOF management means 246, as discussed above. After the global game state has been updated by the global modeling means 344, the server DOF means 346 structures (encodes) the updated game state information in a manner that can be communicated to each mobile game client 200 and that efficiently utilizes the limited bandwidth of the wireless network 100.

Network Architecture

As will be apparent to persons of ordinary skill in the art, multiple variations and modifications of each of the above components may readily be adapted to be used with the present invention. For example, the present invention could be deployed in various combinations of hardware and/or software. Various hardware configurations could be used, each of which could be adapted to the objects of the present inventions. Similarly, various software components could be employed in a manner suitable to achieve the objects of the present invention. Moreover, various alternative algorithms could also be used, each of which would be suitable to accomplish the purposes of the present invention. Thus, it is as intended that the present invention cover the variations and modifications of the present invention, provided they come within the scope of the appended claims and their equivalents.

Various algorithms and standards are known in the art that may be adapted for determining, evaluating, and/or communicating the degrees of freedom to support an interactive application in the manner of the present invention. For example, Distributed Interactive Simulation (DIS) was published by EEL 4781 Computer Networks, University of Central Florida, in the Fall of 1998, and is incorporated herein by reference. The DIS application is described in the paper entitled "Distributed Interactive Simulation (DIS)" by James Heardt and Kevin White, which is incorporated herein by reference. An alternative approach is MiMaze, a distributed multiplayer game on the Internet. Laurent Gautier and Christophe Diot, "Design and Evaluation of MiMaze, a Multiplayer Game on the Internet," which is incorporated herein by reference. Other approaches include those described in "A Network Software Architecture For Large-Scale Virtual Environments," a dissertation by Michael R. Macedonia at the Naval Post-Graduate School in Monterrey, Calif. (June 1995), which is incorporated herein by reference. Simulation Interoperability Standards Organization, Inc., has published draft standards that may also be adapted for use in conjunction with the present invention, such as, for example, RPR-FOM Version 1.0 (Draft), which is incorporated herein by reference. Similarly, the Institute of Electrical and Electronics Engineers has promulgated standards for enumeration and bit-encoded values for use with protocols for distributed interactive simulation applications, such as, for example, IEEE Standard 1278.1 and 1278.2 and accompanying documentation, which are incorporated herein by reference.

Distributed Interactive Simulation (DIS) is a network simulator that is designed to provide logistically efficient and cost-effective support to perform training and provide the ability to practice tactics in a battle simulation. DIS attempts to provide a method of networking heterogeneous simulators together that allows realistic, consistent simulations to occur despite differences in simulator hardware and software, in order to achieve interoperability of network simulators. DIS does this through the use of the DIS protocol standard, UDP. DIS integrates traditional simulator technologies with computer communication technologies to create a system that provides a common battlefield on which the various simulators can interact in active, real-time situations. Input and output is distributed across the simulators in real-time. This feature places limits on latency between hosts. Practical networks using DIS typically require multicasting to implement the required distribution of all data to the participating simulators. These challenges are similar to those that are imposed in interactive gaming environment over a wireless communication network. Nonetheless, the present inventors are not aware of any application of DIS, or similar protocols to the problem of supporting interactive gaming applications, prior to the present invention.

The foundation of DIS data structure is a standard set of messages and rules, called Protocol Data Units (PDUs). An example of one of these PDUs is the Entity State PDU, which represents all of the state information about the simulated entity that all other simulators need to know. For example, an Entity State PDU contains data about the position and velocity of an entity and makes the type, position, orientation, and appearance of an entity available to all of the players of the distributed simulation. To save network bandwidth, extrapolation or dead reckoning is used for the movement of the entity. By using the position, velocity, acceleration, and rotational velocity data, a receiving unit is able to then reckon a vehicle's position before the arrival of the next PDU, thereby reducing consumption of network bandwidth.

DIS is strictly a peer-to-peer architecture, in which all data is transmitted to all simulators where it can be rejected or accepted, depending on the receiver's needs. By eliminating a central server through which all messages pass, DIS dramatically reduces the time needed for a simulator to send important information to another simulator. The lack of a central server greatly increases the realism of the simulator and the effectiveness of the simulation, yet, in this manner, DIS differs from a wireless communications environment, in which communications are mediated by network 100.

The types of PDUs exchanged in the DIS protocol include: entity states; emissions; bit stream packets; environment; fire and detonation. The protocol used by DIS is specified in "Standard for Distributed Interactive Simulation-Application Protocols", Version 2.0.4 (Revised), which is incorporated herein by reference. The DIS system uses "Enumeration and Bit-Encoded Values for Use with IEEE Standards 1278.1-1994 for Distributed Interactive Simulation—Application Protocols", IST-CR-93-46, March 1994, which is incorporated herein by reference. For a definition of the enumerated values contained in the PDU fields specified in the IEEE 1278.1 standard, CCTT simulation application host processors use the Internet standard User Data Graham Protocol (UDP) and the Internet Protocol (IP) for the transportation mechanism for PDUs. The CCTT network interface is consistent with the "Standard for Distributed Interactive Simulation-Communication Services and Profile", IEEE Standard 1278.2-1995, which is incorporated herein by reference.

MiMaze is a distributed (i.e., server list) game that uses "unreliable" communications systems. MiMaze Transmission Control is based on RTP over UDP/IP multicast. Because of the distributed architecture of MiMaze, its synchronization mechanism has to cope with different transmission delays among the participants.

The characteristics of distributed games are very similar to those of DIS applications. MiMaze differs from DIS applications in that the requirements of the application's Central Processing Unit (CPU) are low. The application operates on the Internet. MiMaze employs a fully distributed architecture using multi-point communications support. This architecture offers advantages such as robustness and scalability. Each entity computes its own local view of the global state of the game using information received from the other entities. This locally computed view is then displayed to the local participant.

Network delays in MiMaze being different for all participants on the Internet, synchronization must be introduced to allow ADUs issued at the "same time" to be processed "together" by any participant. In the MiMaze environment, time is divided into fixed length sampling periods and a bucket is associated with each sampling period. All ADUs received by a player that were issued by senders during a given sampling period are stored by the receiver in the bucket corresponding to that interval. When a participant has to deliver an updated global state, it computes all the ADUs available in the "current" bucket. One feature of synchronization is that all participants should display the same game state at the same time. MiMaze includes a global clock mechanism to evaluate the delay between participating entities. The synchronization efficiency of systems such as MiMaze is relatively high. The producers of MiMaze claim that more than 85% of the buckets are delivered "on time" and there is no late ADU. MiMaze purports to be the first multi-player game designed to be totally distributed, i.e., serverless. MiMaze further establishes that distributed approaches providing a good level of performance with potential scalability and real-time properties are accessible to persons of ordinary skill in the art.

These approaches, proposed standards, and standards, however, relate to the transmission of information over wireline networks on a peer-to-peer basis. Due to the greater bandwidth available, aggressive control over the degrees of freedom and management of packet data is not as critical in these prior known environments as it is over a wireless communication network. Accordingly, although these, or other, algorithms and methods could be used in conjunction with the present invention, the present invention goes beyond by providing a system and method for managing degrees of freedom to adapt the application for use over a wireless communications network.

The present invention preferably adapts interactive protocols and standards, specifically to control the degrees of freedom of an interactive application. Whereas DIS and MiMaze are peer-to-peer applications running on the Internet or on distributed wide-area networks, the present invention is preferably adapted to control the degrees of freedom in a manner that efficiently uses bandwidth and enables the interactive application to be rendered in real-time over a wireless communications network.

Figure 4:
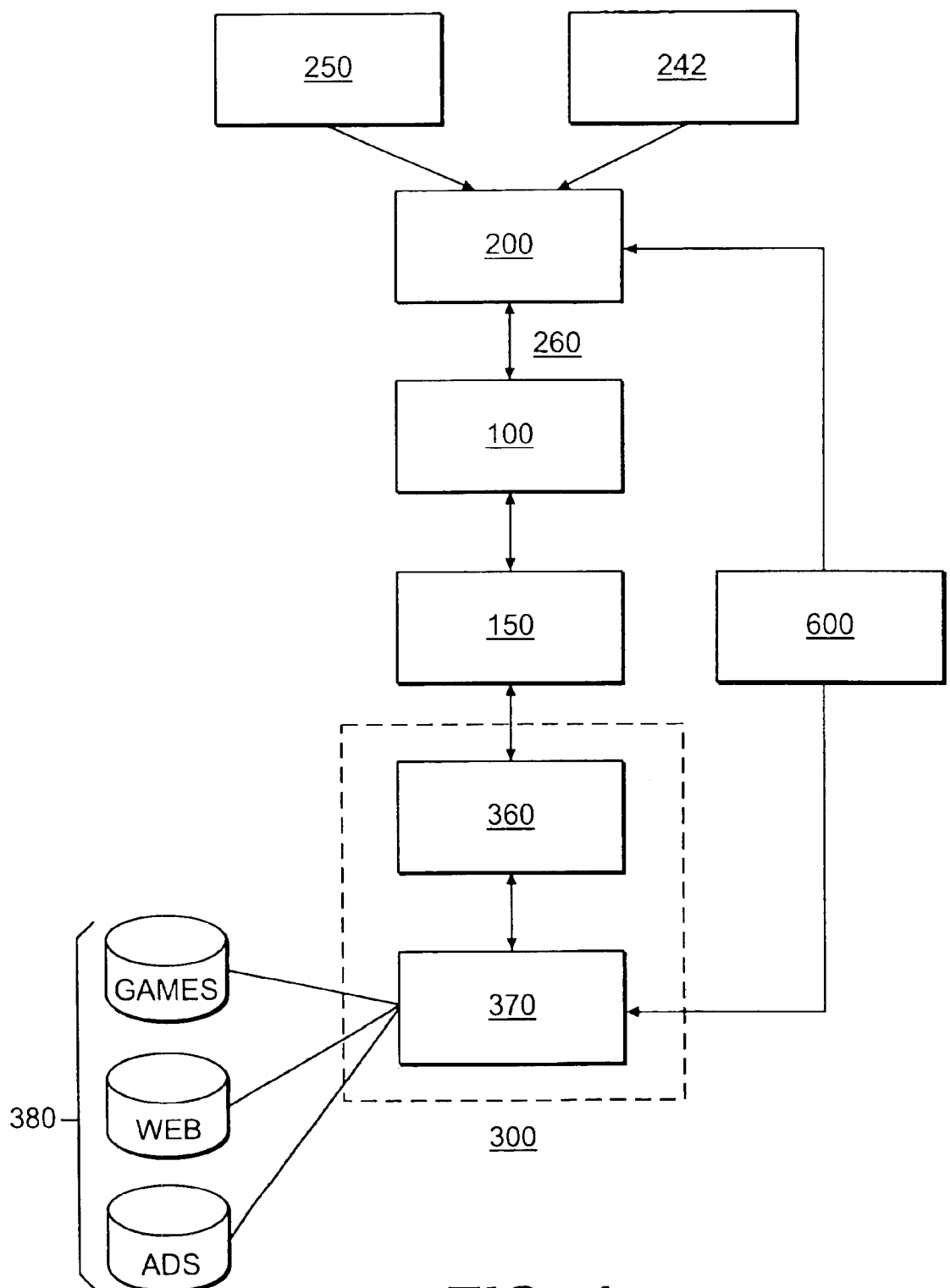
FIG. 4 is a block diagram depicting a sample network architecture suitable for use in conjunction with the system and method of a preferred embodiment of the present invention.
Figure 5:
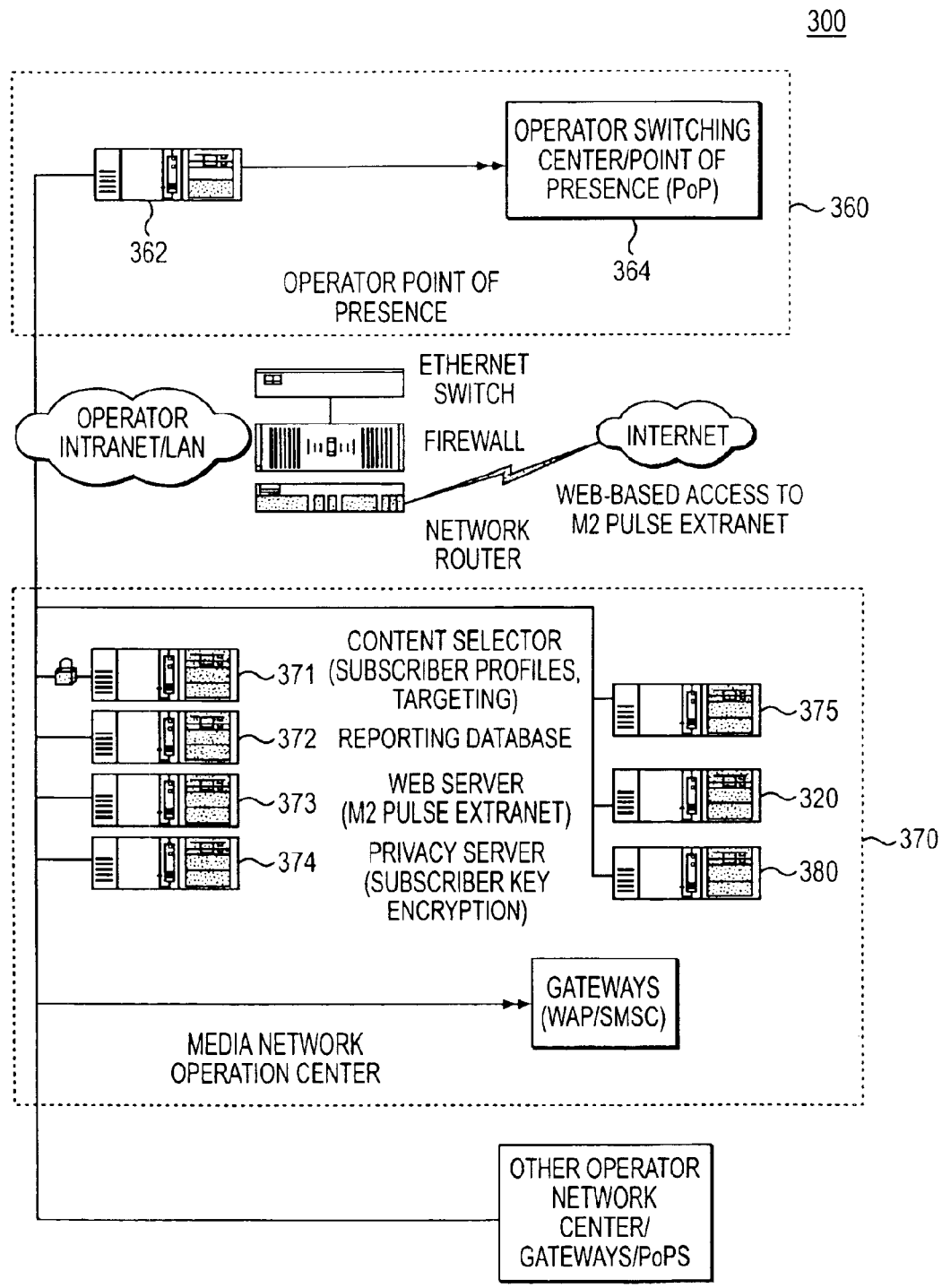
FIG. 5 is a block diagram depicting a sample network architecture of the server of an alternative preferred embodiment of the present invention.
Figure 6:
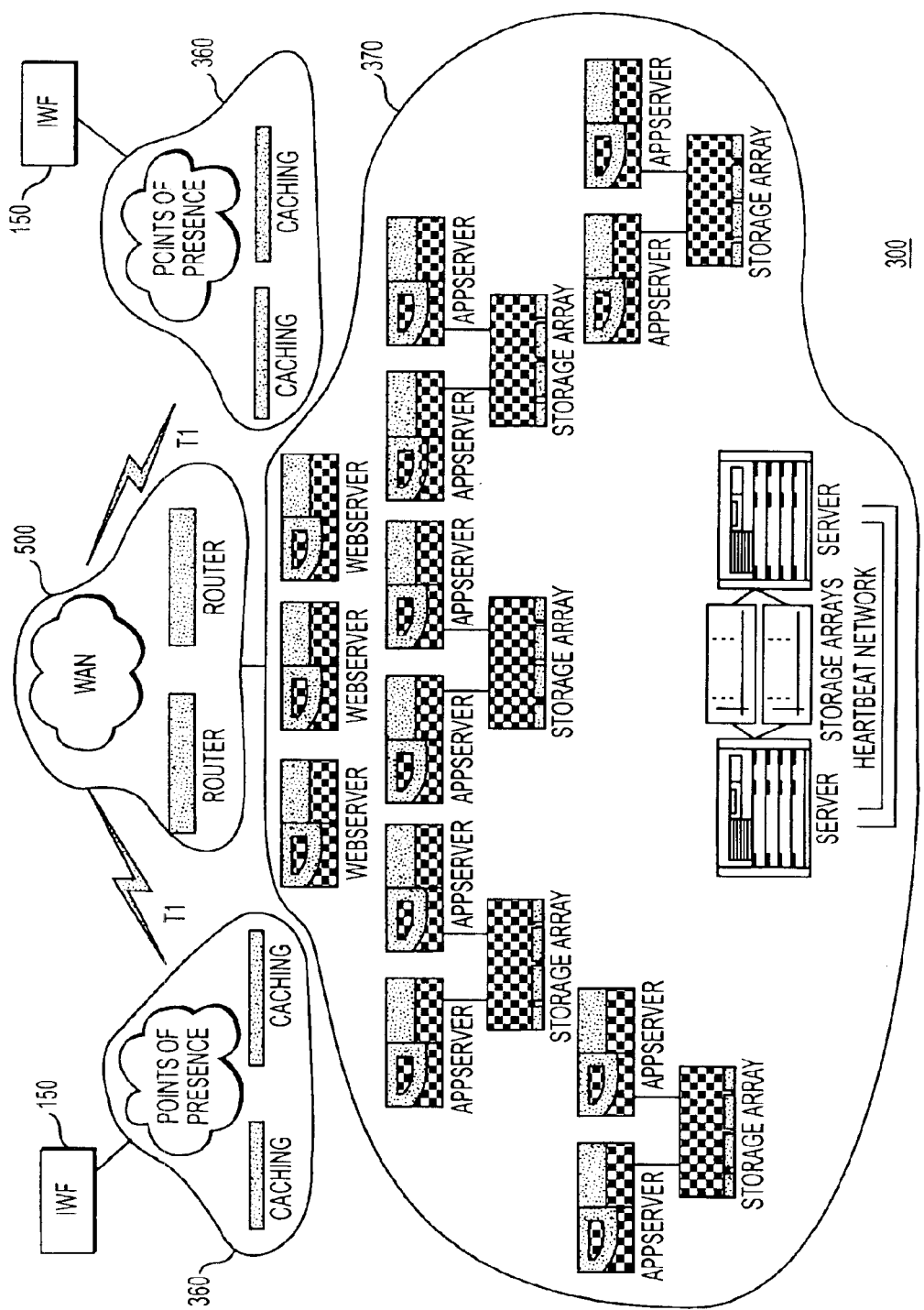
FIG. 6 is a block diagram depicting a sample network architecture of the server of an alternative preferred embodiment of the present invention.

FIGS. 4, 5, and 6 depict alternative preferred embodiments of a network architecture that may be adapted for use in conjunction with the present invention. FIG. 4 depicts a example network architecture suitable for use in conjunction with the system and method of a preferred embodiment of the present invention. As shown in FIG. 4, the system of the present invention preferably comprises: at least one mobile game client 200; the wireless communications network 100; the IWF 150; a server means 300, comprising one or more local caching servers 360, one or more master server means 370, and one or more databases 380; and a customer care means 600. The mobile game client 200 preferably further comprises: an RF Module 250 and the game software 242. As embodied herein, the RF Module 250 preferably comprises CDMAone components to adapt the mobile game client 200 to the functionality of a CDMAone wireless communications network and proprietary airlink information adapted to deliver the particular applications accessible over the wireless communications network. The game software 242, resident on the mobile game client 200, is also preferably provided. The mobile game client 200 communicates over a wireless connection protocol 260 with the network 100. The various components of the network 100 (e.g. base stations 110; base station controller 120; and mobile station controller 130) communicate with one another over wireline connections of a type well known prior to the present invention. As discussed in conjunction with FIG. 1b, the IWF 150 is adapted to communicate with the network 100 through the MSC 130.

As shown in FIG. 4, the server means 300 preferably further comprises: the local caching servers 360; the one or more master server means 370; and one or more databases 380. The database(s) 380 preferably comprise databases for: games; web server functionality; forum functions; advertising; and other dedicated functions provided by the network.

As shown in FIG. 4, the interactive system 10 preferably further comprises the customer care means 600. The customer care means 600 provides, for example, provisioning, billing, and reporting services and may include human and/or automated agent/representatives for providing service support to the customer. The customer care means is preferably adapted to interface both with the mobile game client 200 and the master server means 370. For example, the customer care means 600 may be adapted to interface with the mobile game client 200 through a USB connection of the type well known in the art. Alternatively, customer care means preferably is adapted to cooperate with the server means 300, and in particular, the master server means 370 through server router connections of a type well known in the art prior to the present invention.

As shown in FIG. 5, in an alternative preferred embodiment of the present invention, the server means 300 further comprises: one or more local caching server 360; and one or more master server 370. As shown in FIG. 5, the local caching server 360 further comprises: a media module 362 and an operator switching center 364. In a preferred embodiment, the master server 370 further comprises: game lobby server means 371, for selecting content and managing subscriber profiles, targeting, etc.; a reporting database 372, for managing the persistence function of the server session management means 340; a web server 373, for managing interactive community functions; a privacy server 374 for managing subscriber key encryption information; a game server farm 375, for providing one or more game servers; a communications server 320, for providing instant messaging, chat, and other functions; and memory means 380.

FIG. 6 depicts an alternative preferred embodiment of the server means 300 of the present invention. As shown in FIG. 6, the server means 300 further comprises: one or more local caching servers 360; one or more master servers 370; a backbone 500; and one or more interworking functions 150, corresponding to said one or more local caching servers 360. As depicted in FIG. 6, the local caching server(s) 360 are preferably located near the point of presence of the wireless communications network to the user. For example, in a particular local geographic market, the point of presence caching server 360 may be located adjacent to the Network Operations Center (NOC) of the local wireless communications network. This configuration preferably reduces latency and provides a more effective interactive gaming experience.

As shown in FIGS. 5 and 6, the master server 370 and the local caching server 360 of the present invention preferably provide scalability. It would be apparent to persons of ordinary skill in the art that various modifications and variations may be made in the configuration of the server means 300 without departing from the scope or spirit of the present invention. For example, a single server means 300 may be used in lieu of a separate local caching server 360 and master server 370. In alternative preferred embodiments of the present invention, the server means 300 further comprises one or more local caching server 360, located adjacent to the point of presence of the local wireless communications network; and a single master server 370 serving the operators' entire operation. In further alternative preferred embodiments of the present invention, the server means 300 further comprises: one or more local caching server 360, located adjacent to the point of presence of each of the operators' local geographic networks; and one or more master servers 370, located in the operators' network to enhance the operation and facilitate coordination of the communications and interactive application traffic over the operators' network. Thus, it is intended that the variations and modifications of the server means 300 and, in particular, of the hardware and software components and deployment of the local caching server 360, the master server 370, and multiple levels of servers, be considered part of the invention, provided they come within the scope of the appended claims and their equivalents.

Packet Filling

Figure 15:
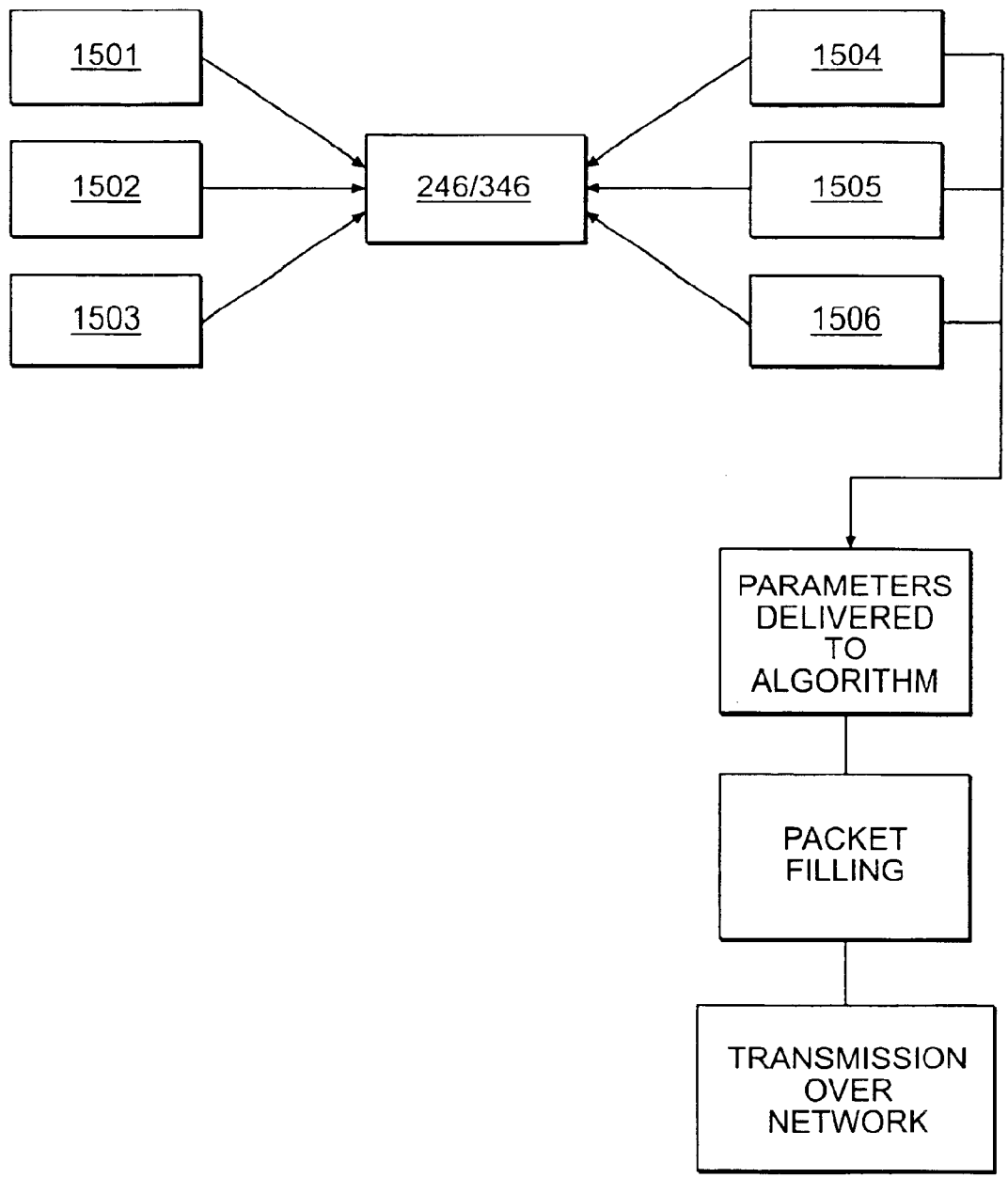
FIG. 15 is a conceptual block diagram depicting the conversion of state, client, and behavior information to time, space, and velocity parameters by the degree of freedom management means of a preferred embodiment of the present invention.

The system of the present invention defines, manages, and/or communicates degree of freedom of information between one or more users (mobile game clients 200) and the network 100 in coordination with the mobile game server 300. FIG. 15 depicts a conceptual block diagram of the conversion of state information 1501, event information 1502, and behavior information 1503 into time information 1504, space information 1505, and velocity information 1506. In a preferred embodiment of the present invention, the degree of freedom management means 246 and 346 take information about the state of the interactive application, various events, and various behaviors by the user and convert that information into parameters for time, space, and velocity of objects in the interactive application that can be rendered the user.

In a preferred embodiment to the present invention, management of degrees of freedom is accomplished by constructing and sequencing communications packets. Construction of packet data is universal to all digital wireless technologies. Packet data preferably carries the required information to render the interactive application to the user. Describing languages are preferably used to construct the bit order and sequencing of a communications packet. Varying numbers of bits are developed over an interval of time that have been transmitted to and from the network. In a preferred embodiment of the present invention, the structuring and sequencing of bits in a packet allows the packet to provide critical information between the mobile game server 300 and the mobile game client 200 in a manner more efficient than those methods known prior to the present invention.

Figure 7:
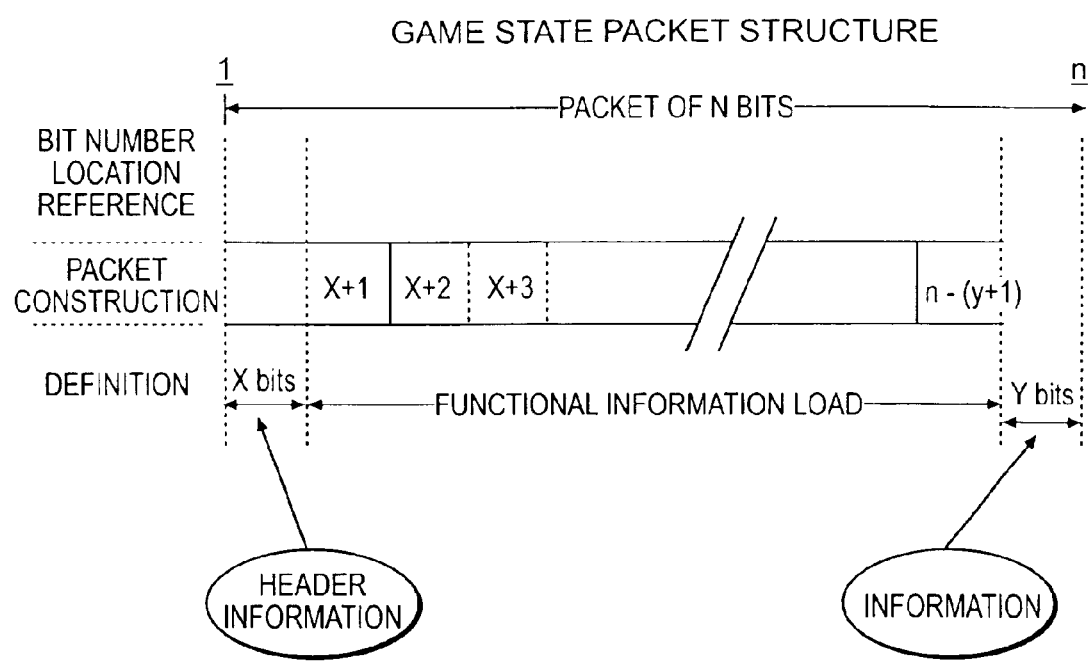
FIG. 7 is a schematic diagram of the structure of a packet data transmission of a preferred embodiment of the present invention.

FIG. 7 depicts a sample game packet structure of the preferred embodiment of the present invention. A bit number location defines the function of each bit within the packet. A reference table as shown in FIG. 8 is generated and/or periodically updated by the mobile game client 200, other participating clients 200, or the mobile game server 300. The reference table is preferably resident on all devices within the client's sphere of influence within the interactive application or local scene model. In this fashion, the reference table allows the packet information to be referenced to specific individual actions within the overall game.

Bandwidth and latency impose inherent difficulties for multiplayer games over a wireless communications network. The mobile game server 300 of the present invention preferably controls the global model of the interactive application. Accordingly, the mobile game server 300 controls the current global game state of the interactive application. Each of the mobile game clients 200 preferably possesses a true subset of the global game state based on its local sphere of influence within a game session. The client session management means 240 and the server session management means 340 preferably communicate information between the local model and the global model. In a preferred embodiment of the present invention, the client session management means 240 and the server session management means 340 communicate (through communication means) this degree of freedom engine information with a minimum amount of data over a wireless communication network by controlling the degrees of freedom and the construction and filling of data products.

As embodied herein, the degree of freedom management means 246 and 346 are adapted to further increase the efficiency of the wireless network 100 by determining which mobile game clients 200 require a global update transmission. This is done based on the relevancy of other game state changes at other participating game clients 200 relative to the specific mobile game client's local model. Degree of freedom packets are preferably filtered at the mobile game server 300 to insure that return trip data has relevance and is economically transmitted to each participating mobile client 200.

The game state preferably is defined by the degree of freedom management means 246 and 346. The degree of freedom management means 246 and 346 preferably include extensible coding languages with object orientation capable of defining game state, event, and behavior of all game objects within a virtual game environment.

The present invention preferably employs game state packets. The game state packets of the present invention preferably enable communication of each player's game state relative to the physics (time, space, and velocity) of the interactive application, as depicted in FIG. 15. In a preferred embodiment of the present invention, game state packets preferably comprise: initialization packets for establishing various game states including players; bit number location references; location state packets; time sequencing and error correction adjustment packets for determining time and correcting errors; and rate initialization and reference packets for determining velocity.

In a preferred embodiment of the present invention the degrees of freedom can be defined by as little as one or more bits, depending on the condition within the game environment that is being controlled. If there is no change of state, no data need be transmitted. Each object that is involved within the game environment is adapted to have a defined set of parameters that will describe its behavior within the game environment. In a preferred embodiment of the present invention some characteristics of the game packets include information that is: character specific; device specific; location specific; object physics; or other characteristics that are adapted to facilitate game play. Degrees of freedom are preferably grouped or mapped to an object library to allow complex movements within the interactive application to be controlled with minimal transmitted information. The characteristics of each packet are preferably specific to the client, client set, or client-server. This allows for larger, complex game environments to be established where multiple players coexist simultaneously, taking actions that may or may not be shown on the client field of play.

The degrees of freedom may define the relevant motions of an object. All objects required in a given application are preferably included in the game object library 348. Each activity of the object is defined by a degree of freedom such as that described in Table 1 below. The degree of freedom establishes the state of the action being controlled. The number of bits dedicated to each degree of freedom may be variable, depending on the action.

TABLE 1

|  | Single Bit | Two Bit | Three Bit |
| --- | --- | --- | --- |
| Defined Bit Location | X + M | X + M<br>X + M + 1 | X + M<br>X + M + 1<br>X + M + 2 |

Table 2 provides an example of how the varying degrees of freedom may be used in an application of the present invention.

TABLE 2

| | Single Bit | | Two Bit | | Three Bit | |
| --- | --- | --- | --- | --- | --- | --- |
| Activity | State | Action | State | Action | State | Action |
| Motion Forward and Back | 0 | Reverse 1 unit | 00 | No Activity | 000 | No Activity |
| | 1 | Forward 1 Unit | 01 | Forward 1 unit | 001 | Forward 1 unit slowly |
| | | | 10 | Reverse 1 unit | 010 | Reverse 1 unit slowly |
| | | | 11 | Jump state action defined in next packet sent | 011 | Jump forward 2 units quickly |
| | | | | | 100 | Jump reverse 2 units quickly |
| | | | | | 101 | |
| | | | | | 110 | |
| | | | | | 111 | |

Functional information is preferably mapped from a bit number location reference to individual degrees of freedom for individual objects within the game session through a degree of freedom variable library. The degree of freedom variable library is preferably established on the mobile game server 300, the client and/or clients 200. FIG. 8 provides an example of a mapping between a bit number location reference, a degree of freedom variable library in the game state of an alternative preferred embodiment of the present invention.

Method of a Preferred Embodiment of the Present Invention

As discussed above, the present invention preferably manages degrees of freedom, in order to improve the transfer of state information for a wireless interactive application.

In a preferred embodiment, the present invention comprises a process and method for determining and communicating an instruction set for describing change of state information. The method preferably further comprises: determining the degrees of freedom, based upon the instructions set; reducing the instruction set and/or the degrees of freedom to achieve a desired efficient configuration of the change of state information; and synchronizing the action of each of the users relative to each other in order to facilitate the interactive application among one or more users. Determination of the instruction set is preferably based on a number of factors including, without limitation: the features and characteristics of the client 200; the version of the interactive application that is being executed; user preferences; control protocols relative to the wireless communication network 100 and the client 200 with respect to the interactive application; and the features and characteristics of the interactive application itself.

In a preferred embodiment, the process of determining the degrees of freedom associated with the interactive application further comprises consideration of additional parameters, including one or more of the following: the degree to which degrees of freedom may be layered or combined; any limitations applicable to the degrees of freedom; device specific parameters; considerations of network efficiencies; and handling of projectiles. Layering of degrees of freedom preferably further comprises any one or more of the following techniques: creating a metaset of degrees of freedom that combines one or more other degrees of freedom to create a more complexed or combined action; reducing entire server displays to one or more degrees of freedom; depicting a single action as a degree of freedom, or alternatively, combining a series of actions into one or more degrees of freedom. To the extent that various actions depicted by certain degrees of freedom typically occur together, those groups of degrees of freedom may be combined into an alternative degree of freedom to further compress the data transfer requirements. In addition, special degrees of freedom may be created to perform unique or unusual maneuvers in the interactive application.

Limits are preferably imposed on degrees of freedom based on one or more of a number of parameters: independently; arbitrarily; or the users' or system operators' preferences. Limits may be imposed on various of the degrees of freedom based on rules of the interactive application that is being executed. Limits may be imposed on certain degrees of freedom based on system parameters or requirements. Similarly, the device specific degrees of freedom may be adapted based upon one or more of the following capabilities of the client 200: graphics; sounds; scent; temperature; vibrations; and/or feedback. The determination of degrees of freedom based on network efficiency of the process of determining degrees of freedom may be based on any factor that influences the efficiency of transfer of information over the air interface. These may include any one or more of the following, without limitation: frame transfer rate; the size of the frame at the point on which the frame is transferred, namely the degree to which the frame is filled before being transferred; the data transfer rate; and packet definition.

In a preferred embodiment, the step of reducing the instruction set and/or the degrees of freedom to the critical set desired to execute the interactive application further comprises reducing the instruction set and/or the degrees of freedom in order to more efficiently manage the transfer of state information over the air interface. It will be apparent to persons of ordinary skill in the art that variations and modifications may be made in the manner in which the instruction set and/or degrees of freedom are managed to achieve this goal without departing from the scope or spirit of the invention. For example, in determining the instruction set, the instruction set could be analyzed critically to determine the minimal number of instructions that are necessary in order to render the interactive application. Only those minimal number of instructions could then be converted into degrees of freedom which are managed over the air interface. Alternatively, the desired instruction set for the interactive application could be determined and all of the instruction set converted into degrees of freedom. At that point, the degrees of freedom could be analyzed critically to determine the least number of degrees of freedom necessary to render the interactive application in the desired format. The balance of the degrees of freedom from the original instruction set could be ignored and only those degrees of freedom that are necessary or critical to render the interactive application in the desired format could be transmitted over the air interface. The reduction of the instruction set and/or the degrees of freedom may be based on user input; input from other users; or the conditions of the state of play (such as rain, storms, snow, wind, and a variety of other environmental parameters). Thus, it is intended that the variations and modifications of the invention be included, provided they come within the scope of the appended claims and their equivalents.

In a preferred embodiment, the transfer of state information further comprises managing the synchronization in a manner to provide the desired gaming experience. This can be accomplished in a number of ways, including, without limitation: lagging other users of the interactive application to synchronize the action of the interactive application with the slowest user or allowing the fastest player to proceed and snapping other users to the same point in the game; or determining one or more users whose state of play determines the point of synchronization and snapping the balance of the users to that point. During the course of playing an interactive game, a variety of factors may cause one or more of the users to lag behind the balance of the users of the application. For example, interference for multi-path signals may delay or disrupt the transmission of the interactive application to one or more of the users. In that case, the user whose signal is disrupted may begin to lag behind other users of the game. In addition, it is possible that through a variety of disruptive effects on various of the users that one or more, or all of the users may begin to lag relative to each other in the state of play of the interactive application. Thus, the present invention preferably includes a process for synchronizing the various users of the interactive application, periodically throughout the execution of the interactive application, in order to synchronize the interactive gaming experience.

The present inventors anticipate that the system and method of a preferred embodiment of the present invention are fully compatible and usable in conjunction with PC-based games, as well as Internet applications, and TV-based games. In addition, the present inventors anticipate that the service employing the system and method of the present invention may be offered as a flat rate offering in conjunction with services such as Assignee's Cricket™ wireless communications service. Such services may be offered on a prepaid billing service for game purchase. In addition, scores may be posted through the wireless network 100 in a number of locations. Numerous other variations and modification will be apparent to persons of ordinary skill that will facilitate the delivery of wireless interactive applications, at high level of graphic quality, while more efficiently using network bandwidth and resources than prior known systems and methods. Thus, it is intended that the present invention include the variations and modification that may be used in conjunction with them, provided they come within the scope of the appended claims and their equivalents.

FIGS. 9 through 14 depict a series of alternative preferred embodiments of the present invention. As shown in FIGS. 9 through 14, degrees of freedom are determined and communicated between the mobile game client(s) 200 and the server means 300 through the network 100.

FIG. 9 depicts a communication cycle of a preferred embodiment of the present invention. The server means 300 maintains global state information regarding the interactive application. The server means 300 communicates with one or more mobile game clients 200, depicted in FIG. 9 as game states 1 through 4, over the network 100. As shown in FIG. 9, game state 1 is maintained on the first mobile game client 200; game state two is maintained on the second mobile game client 200; etc. The session management means 240 of the respective clients 200 determines the game state of each client device. The degrees of freedom management means 246 determines the degrees of freedom corresponding to the state, or change in state, of the game running on that client's device. The client communication means 220 communicates the pertinent degree of information relating to the game state over the network 100 to the server means 300. The server means 300 preferably gathers the game state information from each of the mobile game clients 200 to update the global model through server session management means 340. After updating the global model, the server 300 transmits back through the network 100 packet data corresponding to the degrees of freedom required to update the state of play of each of the mobile game clients 200.

Figure 10:
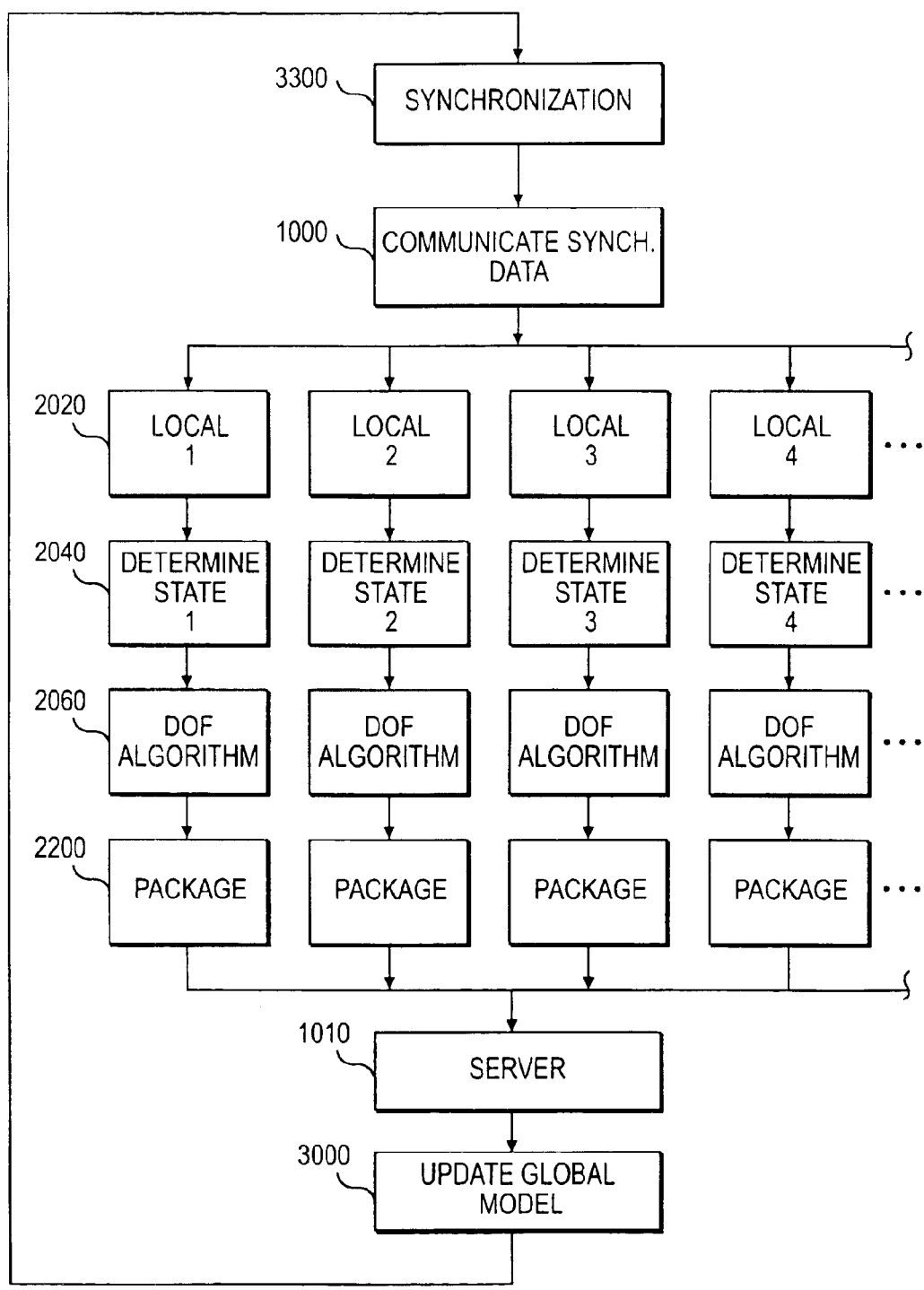
FIG. 10 is a flowchart depicting a method of a preferred embodiment of the present invention to determine and communicate degree of freedom information from one or more clients to a server.
Figure 11:
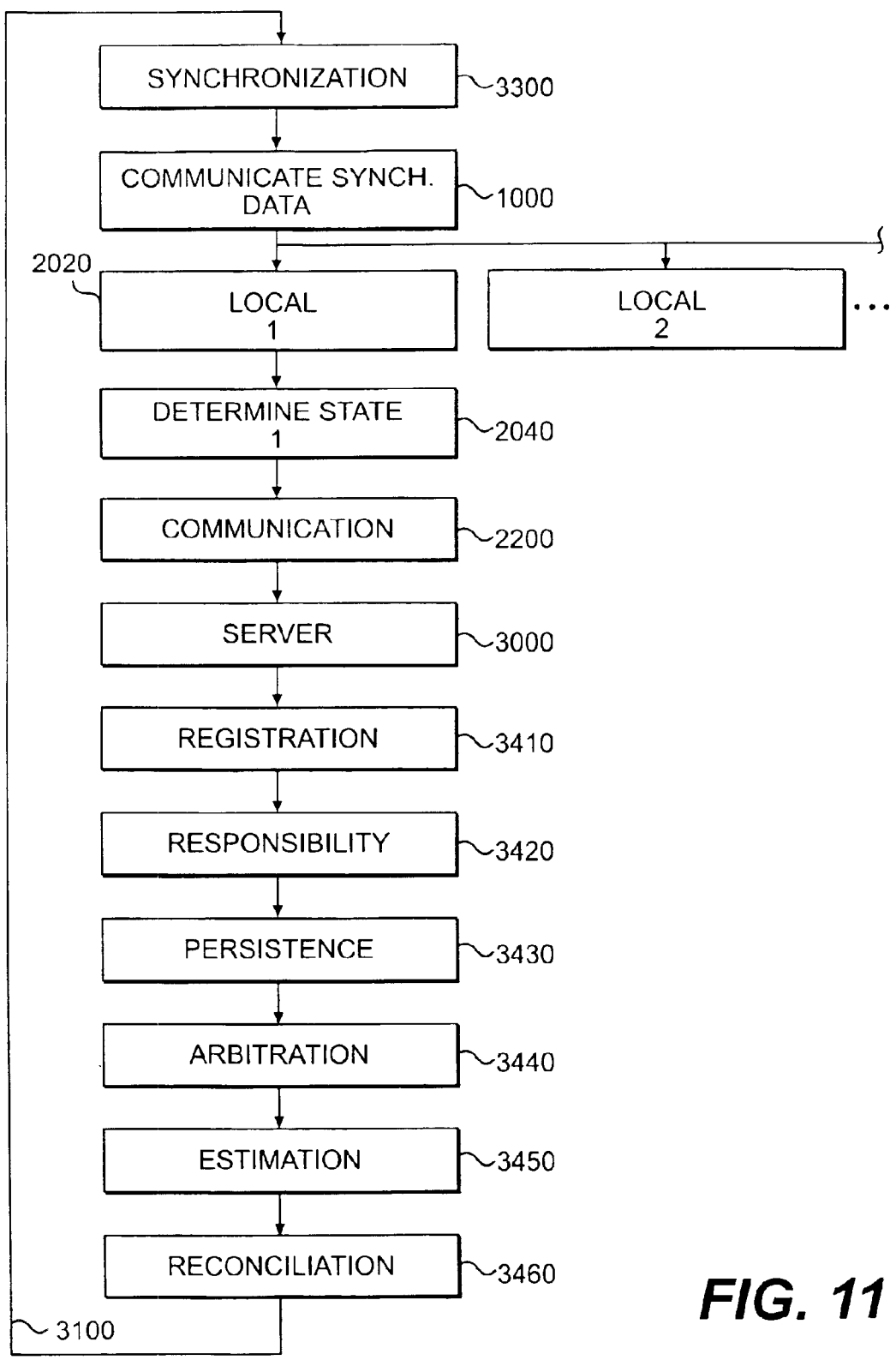
FIG. 11 is a flowchart depicting a method of determining and communicating degrees of freedom by the server of an alternative preferred embodiment of the present invention.

FIG. 10 depicts an alternative preferred embodiment of a communication cycle of the method of the present invention. As shown in FIG. 10, a method of the present invention preferably comprises the step 3300 of synchronizing the users with the server means 300, preferably using the clock 332 and synchronization means 334 of server synchronization means 330. In step 1000, the server communications means 320 then communications the synchronization data with each of the mobile game clients 200 over the network 100.

By means of example, only and not by means of limitation, mobile game clients 1 through 4 are depicted in FIG. 10 as local 1 through local 4. Each mobile game client 200 experiences its own state of play in steps 2020. The local modeling means 244 at each mobile game client 200 then determines the state of play of that client device in steps 2040 and communicates that information to the client (DOF) management means 246. Each of the DOF management means 246 determines the degrees of freedom necessary to manage the state of play of each of the mobile game clients 200 in steps 2060. The degrees of freedom information, determined in steps 2060, is then communicated to each of the client communications means 220 in step 2200, and packaged according to the instructions provided. The client communications means 220, in turn, communicates the degrees of freedom information in step 1010 over the wireless communication network 100 to the server means 300. In step 3000, the server means 300 undertakes to update the global model of the interactive application in the server session management means 340. The server means 300 transmits the requisite information to the server synchronization means 330, which undertakes the steps of synchronizing the communications between the server and the local client devices in step 3300, preferably using clock 332 and synchronization means 334. The server communication means 320 then communicates with the wireless communication network 100, preferably through interworking function 150, to transmit the updated and synchronized global information to each of the client server devices 200.

FIG. 11 illustrates a method for managing state information for an alternative preferred embodiment of the method of the present invention further comprising the steps of: registration 3410; responsibility 3420; persistence 3430; arbitration 3440; estimation 3450; and reconciliation 3460. In an alternative preferred embodiment of the present invention, one or more of the further steps of registration, responsibility, persistence, arbitration, estimation, and reconciliation are performed by the server session management means 340 and/or the client session management means 240 in order to coordinate interactive applications among the server 300 and the mobile game clients 200. FIG. 11 depicts a communication cycle of a method of a preferred embodiment of the present invention showing the registration, responsibility, persistence, arbitration, estimation, and reconciliation functions being performed by the server session management means 340.

As shown in FIG. 11, in step 3300, the server synchronization means 330 synchronizes the state of each of the mobile game clients 200 and the server means 300, preferably using the system clock 332 and the synchronization means 334. In step 1000, the server communication means 320 then preferably transmits the synchronization information over the wireless communication network 100 to each of the at least one mobile game clients 200. Each mobile game client 200 experiences its own state of play in steps 2020. The local modeling means 244 at each mobile game client 200 then determines the state of play of that client device in steps 2040. The mobile game client 200 communicates the local state information to the client communication means 220 in step 2200. The communication manager 220 communicates the local state information to the server means 300 over the wireless communication network 100 in step 3000. The server communication means 320 transmits the state information from each mobile game client 200 to the server session management means 340. The server session management means 340 then undertakes the further steps of: registering the mobile gave client 200 in step 3410; determining responsibility for various activities in the interactive application in steps 3420; insuring persistence of various objects in the interactive application in steps 3430; arbitrating any conflicts between users and/or the server in steps 3440; estimating the position of objects that have changed to date in step 3450; and reconciling any conflicts that have arisen through the session management means processing in step 3460. In step 3100, the server session management means 340 then transmits the updated global model information to the server synchronization means 330 where the process begins again.

Figure 12:
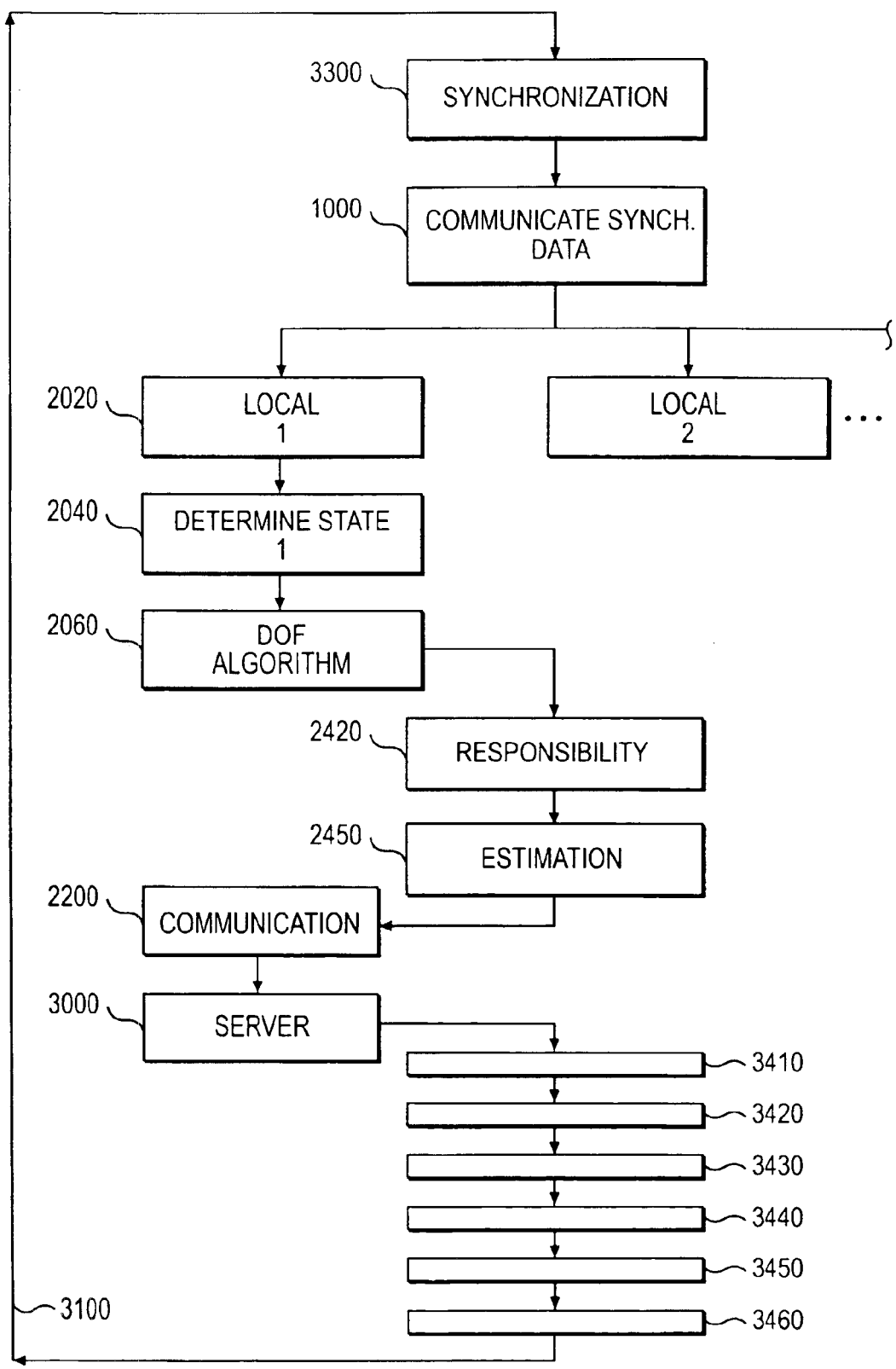
FIG. 12 is a flowchart depicting a method of an alternative preferred embodiment of the present invention in which the client device is adapted to perform the responsibility and estimation functions of the degree of freedom management process.

FIG. 12 depicts an alternative preferred embodiment of the present invention in which some, but not all, of the degrees of freedom management functions are performed at each of the mobile game client 200. As shown in FIG. 12, in the synchronization step 3300, the server synchronization means 330 undertakes the process of synchronizing the client devices with the interactive application and the server means 300, preferably using the system clock 332 and the synchronization means 334. The server synchronization means 330 then transmits the requisite synchronization information to the server communication means 320. In step 1000, the server communication means 320 then preferably transmits the synchronization information over the wireless communication network 100 to each of the at least one mobile game clients 200. Each mobile game client 200 experiences its own state of play in steps 2020. The local modeling means 244 at each mobile game client 200 then determines the state of play of that client device in steps 2040.

In contrast to FIG. 11, in which none of the degrees of freedom management functions are performed on the mobile game client 200, FIG. 12 depicts a method in which the client DOF management means 246 performs the steps of determining degrees of freedom corresponding to responsibility in step 2420, and undertaking to evaluate and determine the degrees of freedom corresponding to the estimation function in step 2450. This information is then communicated through the communication means 220 in step 2200, as depicted in FIGS. 11 and 12.

Figure 13:
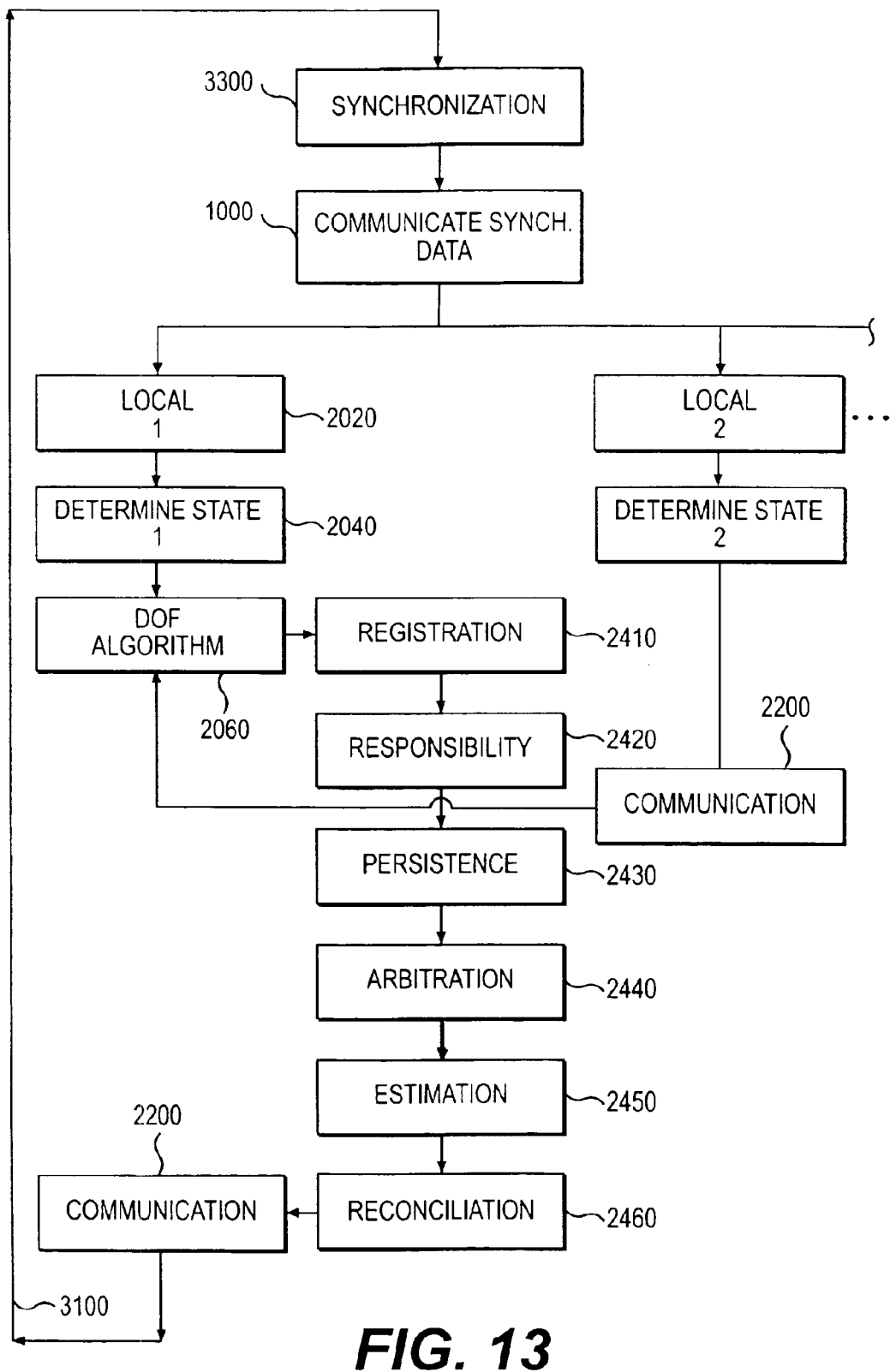
FIG. 13 is a flowchart depicting a method of an alternative preferred embodiment of the present invention in which a client device is adapted to perform the degree of freedom management function.

FIG. 13 shows a method of an alternative preferred embodiment of the present invention in which peer-to-peer communications have been enabled. Each of the mobile game clients 200 is performing the degrees of freedom management functions, and the server means 300 is not performing any of the degrees of freedom management function normally attributed to the server session management means 340. As shown in FIG. 13, the client DOF management means 246 undertakes the steps of registration 2410; responsibility 2420; persistence 2430; arbitration 2440; estimation 2450; and reconciliation 2460. In a peer-to-peer environment, as shown in FIG. 13, one of the mobile game clients 200 (in the example shown in FIG. 13, local 1) undertakes the degrees of freedom management functions on behalf of all of the mobile game clients 200 that are communicating with respect to the interactive application.

Figure 14:
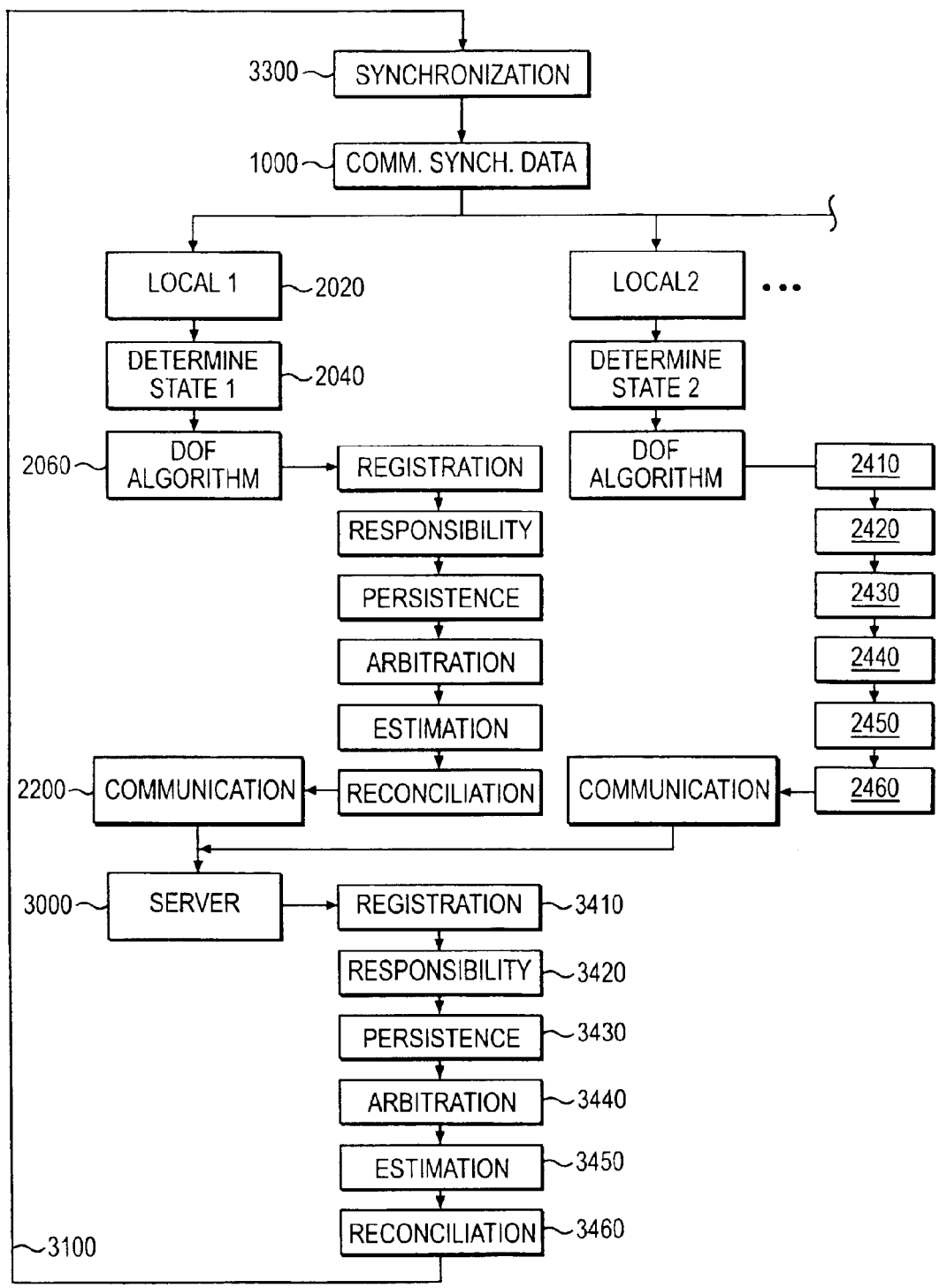
FIG. 14 is a flowchart depicting a method of an alternative preferred embodiment of the present invention in which one or more client devices and a server are adapted to perform the degree of freedom management function.

FIG. 14 depicts a method of yet another alternative preferred embodiment of the present invention in which each of the mobile game clients 200 and the game server 300 are undertaking each of the registration, responsibility, persistence, arbitration, estimation, and reconciliation functions as depicted in FIGS. 9 through 13.

The above description is merely illustrative of the preferred methods of using the invention and is not intended to limit the invention as disclosed and claimed. It will be apparent to persons of ordinary skill in the art that various modifications and variations may be made in the process of the present invention. Thus, it is intended that the present invention include these variations and modifications, provided they come within the scope of the appended claims and their equivalents.

What is claimed:

1. A system for managing state information related to an interactive application to accommodate one or more users participating in an interactive application session, wherein the state information comprises local state information specific to each of the one or more user's unique view of the interactive application and global state information, the system comprising:
    a telecommunications network;
    an application server in communication with said telecommunications network for managing the global state information relative to all of the users participating in the interactive application session; and
    at least one mobile client device in communication with said application server over said telecommunications network for managing the local state information for each of the one or more users, wherein said telecommunications network comprises a wireless communications network, comprising at least one base station, at least one base station controller, and at least one mobile switching center,
    wherein said application, server further comprises: communication means for receiving the local state information from said at least one mobile client device;
    a global modeler for comparing the received local state information with the global state information and updating the global state information;
    a server state manager for structuring the updated global state information for optimized delivery over said wireless communications network, wherein said server state manager structures the updated global state information based upon degrees of freedom associated with the interactive application; and
    wherein said communication means delivers the updated global state information to said at least one mobile client device.

2. A system for managing state information related to an interactive application to accommodate one or more users participating in an interactive application session, wherein the state information comprises local state information specific to each of the one or more user's unique view of the interactive application and global state information, the system comprising:
    a telecommunications network;
    an application server in communication with said telecommunications network for managing the global state information relative to all of the users participating in the interactive application session; and
    at least one mobile client device in communication with said application server over said telecommunications network for managing the local state information for each of the one or more users, wherein said at least one mobile client device further comprises a local modeler for comparing the local state information to the global state information, wherein differences between the local state information and the global state information comprise changed state information, a client state manager for structuring the changed state information for optimized delivery over said wireless communications network; and communication means for delivering the changed state information to said application server over said wireless communications network, wherein said client state manager structures the changed state information based upon degrees of freedom associated with the interactive application.

3. An interactive application server for managing global state information related to an interactive application relative to local state information received from one or more mobile client devices over a wireless communications network during an interactive application session, comprising:
    communication means for receiving the local state information from each of the one or more mobile client devices;
    a global modeler for comparing the received local state information with the global state information and updating the global state information; and
    a server state manager for structuring the updated global state information for optimized delivery over the wireless communications network, wherein said server state manager structures the updated global state information based upon degrees of freedom associated with the interactive application.

4. A mobile client device for managing local state information related to an interactive application relative to global state information maintained by an application server during an interactive application session between one or more users over a wireless communications network, comprising:

a local modeler for comparing the local state information to the global state information, wherein differences between the local state information and the global state information comprise changed state information;

a client state manager for structuring the changed state information for optimized delivery over the wireless communications network, wherein said client state manager structures the changed state information based upon degrees of freedom associated with the interactive application; and communication means for delivering the changed state information to the application server over the wireless communications network.

5. A method for managing state information related to an interactive application to accommodate one or more users participating in an interactive application session, wherein the state information comprises local state information specific to each of one or more mobile client devices operated by the one or more users and global state information maintained at an application server, the method comprising:

comparing the local state information to the global state information at each of the mobile client devices, wherein differences between the local state information and the global state information comprise chanced state information;

structuring the chanced state information for optimized delivery over a wireless communications network;

delivering the changed state information to the application server over the wireless communications network; and updating the global state information based on the changed state information received from each of the mobile client devices, wherein said step of structuring the changed state information further comprises the steps of:

determining an initial set of instructions for describing the changed state information based on at least one system parameter; and mapping at least one degree of freedom associated with the interactive application to the initial set of instructions.

6. The method of claim 5, further comprising the step of minimizing the number of degrees of freedom to achieve an efficient configuration of the changed state information.

7. The method of claim 5, wherein the at least one system parameter is selected from the group consisting of: the characteristics of the one or more mobile client devices, the characteristics of the interactive application, preferences of the one or more users, and control protocols relative to the wireless communications network and the one or more mobile client devices.

8. A method for managing state information related to an interactive application to accommodate one or more users participating in an interactive application session, wherein the state information comprises local state information specific to each of one or more mobile client devices operated by the one or more users and global state information maintained at an application server, the method comprising:

comparing the local state information to the global state information at each of the mobile client devices, wherein differences between the local state information and the global state information comprise changed state information;

structuring the changed state information for optimized delivery over a wireless communications network;

delivering the changed state information to the application server over the wireless communications network;

updating the global state information based on the changed state information received from each of the mobile client devices;

synchronizing the time of the changed state information relative to the global state information;

structuring the updated global state information for optimized delivery over the wireless communications network; and delivering the undated global state information to each of the mobile client devices over the wireless communications network, wherein said step of structuring the updated global state information further comprises the steps of:

determining an initial set of instructions for describing-the updated global state information based on at least one system parameter; and mapping at least one degree of freedom associated with the interactive application to the initial set of instructions.

9. The method of claim 8, further comprising the step of minimizing the number of degrees of freedom to achieve an efficient configuration of the updated global state information.

10. A method for managing state information related to an interactive application to accommodate one or more users participating in an interactive application session, wherein the state information comprises local state information specific to each of one or more mobile client devices operated by the one or more users and global state information maintained at an application server, the method comprising:

comparing the local state information to the global state information at each of the mobile client devices, wherein differences between the local state information and the global state information comprise changed state information;

structuring the changed state information for optimized delivery over a wireless communications network;

delivering the changed state information to the application server over the wireless communications network;

updating the global state information based on the changed state information received from each of the mobile client devices;

synchronizing the time of the changed state information relative to the global state information;

structuring the updated global state information for optimized delivery over the wireless communications network;

delivering the updated global state information to each of the mobile client devices over the wireless communications network;

determining the one or more users whose state of play determines the point of synchronization; and placing each of the one or more users at the point of synchronization in the interactive application session, wherein said step of delivering the updated global state information further comprises the step of managing the synchronization of the updated global state information delivered to each of the mobile client devices with the local state information.

11. A method for managing the transfer of state information for an interactive application between at least one mobile client device and a mobile game server over a telecommunications network, comprising:

structuring the state information for optimized delivery over the telecommunications network;

transferring the state information over the telecommunications network determining an initial set of instructions necessary to render the state information over the telecommunications;

minimizing the initial set of instructions to achieve an efficient configuration of the state information; and mapping degrees of freedom to the minimized set of instructions.

12. A method for managing the transfer of state information for an interactive application between at least one mobile client device and a mobile game server over a telecommunications network, comprising:

structuring the state information for optimized delivery over the telecommunications network;

transferring the state information over the telecommunications network determining an initial set of instructions for describing the state information;

mapping at least one degree of freedom associated with the interactive application to the initial set of instructions; and minimizing the number of degrees of freedom to achieve an efficient configuration of the state information.

13. A method for managing the transfer of state information for an interactive application between at least one mobile client device maintaining local state of the interactive application information (local state information) and an interactive application server maintaining global state of the interactive application information (global state information), the method comprising the steps of:

determining synchronization information for synchronizing first global state information corresponding to the application server and first local state information corresponding to the at least one mobile client device;

communicating the synchronization information to the at least-one mobile client device;

determining second local state information of the at least one mobile client device;

comparing the first local state information to the second local state information to determine changes in the local state information;

determining degrees of freedom corresponding to the changed local state information of the at least one mobile client device;

communicating to the interactive application server the degrees of freedom information corresponding to the changed local state information;

determining second global state information based on the changed local state information received from the at least one mobile client device; and communicating the second global state information to the at least one mobile client device to synchronize the second global state information corresponding to the application server and the second local state information corresponding to the at least one mobile client device.

* * * * *